US012099857B2

(12) United States Patent
Ding et al.

(10) Patent No.: US 12,099,857 B2
(45) Date of Patent: Sep. 24, 2024

(54) DYNAMIC CARD DISPLAY METHOD AND APPARATUS

(71) Applicant: HONOR DEVICE CO., LTD., Guangdong (CN)

(72) Inventors: Yiyan Ding, Shenzhen (CN); Jiazi Chen, Shenzhen (CN); Xintong Bao, Shenzhen (CN); Junting Jiao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/928,885

(22) PCT Filed: Apr. 26, 2022

(86) PCT No.: PCT/CN2022/089296
§ 371 (c)(1),
(2) Date: Nov. 30, 2022

(87) PCT Pub. No.: WO2022/247564
PCT Pub. Date: Dec. 1, 2022

(65) Prior Publication Data
US 2024/0103888 A1 Mar. 28, 2024

(30) Foreign Application Priority Data
May 28, 2021 (CN) .......................... 202110593855.X

(51) Int. Cl.
G06F 3/048 (2013.01)
G06F 3/0481 (2022.01)
(Continued)

(52) U.S. Cl.
CPC ............ *G06F 9/451* (2018.02); *G06F 3/0481* (2013.01); *G06F 3/04842* (2013.01); *G06Q 10/1093* (2013.01); *G06F 2203/04803* (2013.01)

(58) Field of Classification Search
CPC .... G06F 9/451; G06F 3/0481; G06F 3/04842; G06F 2203/04803; G06Q 10/1093
See application file for complete search history.

(56) References Cited

U.S. PATENT DOCUMENTS 7,761,800 B2 * 7/2010 Chaudhri ................ G06F 9/451
715/767
8,954,871 B2 * 2/2015 Louch ................. G06F 3/04842
715/764
(Continued)

FOREIGN PATENT DOCUMENTS

CN 102841732 A 12/2012
CN 106843664 A 6/2017
(Continued)

Primary Examiner — David Phantana-angkool
(74) Attorney, Agent, or Firm — Fish & Richardson P.C.

(57) ABSTRACT

Embodiments of this application provide a dynamic card display method and an apparatus. The method may be applied to electronic devices such as a mobile phone and a tablet computer. In the method provided in embodiments of this application, a mobile phone may divide a card into two partitions: a left partition and a right partition. When there are a plurality of ongoing tasks in an application corresponding to the card, the two partitions may separately display different tasks, and sizes of the left and right partitions are adjusted according to a preset rule, to display more information.

8 Claims, 30 Drawing Sheets

(51) Int. Cl.
*G06F 3/04842* (2022.01)
*G06F 9/451* (2018.01)
*G06Q 10/1093* (2023.01)

(56) References Cited

U.S. PATENT DOCUMENTS

| | | | |
|---|---|---|---|
| 9,912,813 B2* | 3/2018 | Vymenets | G06Q 50/40 |
| 10,324,609 B2* | 6/2019 | Sanches | G06F 16/26 |
| 10,979,551 B2* | 4/2021 | Zhu | H04M 1/72484 |
| 11,188,923 B2* | 11/2021 | Bansal | G06F 3/0484 |
| 2015/0235291 A1 | 8/2015 | Berger et al. | |
| 2016/0062616 A1 | 3/2016 | Lee et al. | |
| 2016/0349936 A1 | 12/2016 | Cho et al. | |
| 2019/0230215 A1* | 7/2019 | Zhu | H04W 68/005 |
| 2020/0019420 A1* | 1/2020 | Saimani | G06F 9/453 |
| 2021/0082028 A1* | 3/2021 | Chen | G06Q 30/0205 |
| 2021/0342785 A1* | 11/2021 | Mann | G06F 3/0488 |
| 2022/0107821 A1* | 4/2022 | Zhu | G06F 3/0346 |
| 2022/0214800 A1* | 7/2022 | Dong | G06F 3/0483 |
| 2022/0224665 A1 | 7/2022 | Zhou et al. | |
| 2022/0254120 A1* | 8/2022 | Berliner | G06F 3/14 |
| 2022/0291816 A1* | 9/2022 | Fan | G06F 3/0488 |
| 2023/0088628 A1* | 3/2023 | Duan | G06F 3/0414 |
| | | | 345/173 |
| 2023/0115868 A1* | 4/2023 | Jiang | G06Q 30/0643 |
| | | | 715/781 |

FOREIGN PATENT DOCUMENTS

| | | |
|---|---|---|
| CN | 107273006 A | 10/2017 |
| CN | 108958867 A | 12/2018 |
| CN | 109101147 A | 12/2018 |
| CN | 109800135 A | 5/2019 |
| CN | 110297579 A | 10/2019 |
| CN | 110351422 A | 10/2019 |
| CN | 110472168 A | 11/2019 |
| CN | 110647274 A | 1/2020 |
| CN | 110691167 A | 1/2020 |
| CN | 111182145 A | 5/2020 |
| CN | 112199610 A | 1/2021 |
| CN | 112684969 A | 4/2021 |
| CN | 113722028 A | 11/2021 |
| CN | 107066268 A | 3/2022 |
| EP | 3757924 A1 | 12/2020 |
| WO | 2017193515 A1 | 11/2017 |
| WO | 2021023021 A1 | 2/2021 |

* cited by examiner

DYNAMIC CARD DISPLAY METHOD AND APPARATUS

CROSS-REFERENCE TO RELATED APPLICATIONS

This application is a national stage of International Application No. PCT/CN2022/089296, filed on Apr. 26, 2022, which claims priority to Chinese Patent Application No. 202110593855.X, filed on May 28, 2021. The disclosures of both of the aforementioned application are hereby incorporated by reference in their entireties.

TECHNICAL FIELD

This application relates to the field of terminals, and in particular, to a dynamic card display method and an apparatus.

BACKGROUND

A smart terminal device such as a mobile phone may provide a card display function for an application installed on the device. The application may display, by using a card, important information that a user cares about. For example, a flight card may display a flight booked by a user, and a schedule card may display a schedule of a user.

However, due to a card size limitation, an existing card displays a relatively small amount of content, or information in a card is stacked. When a card displays a relatively small amount of content, information obtained by a user from the card is limited. When a card displays as much information as possible, the information in the card is stacked, or more cards are generated. Although a user can obtain more information, obtaining costs increase.

SUMMARY

Embodiments of this application provide a dynamic card display method and an apparatus. In the method, an electronic device such as a mobile phone may divide a card into a left partition and a right partition for display, and adjust sizes and displayed content of the left partition and the right partition based on a condition such as a time, a location, or whether a user operation is detected, so that more information is displayed and information stacking is avoided.

According to a first aspect, an embodiment of this application provides a dynamic card display method. The method is applied to an electronic device, and the method includes: displaying a first interface, where the first interface displays a first card, the first card includes a first region and a second region, the first region displays first content, and the second region displays second content; obtaining first status data, where the first status data is data obtained based on a preset status data type: and adjusting, based on the first status data, the content displayed in the first region and/or the second region.

According to the method provided in the first aspect, the electronic device may display a card with two partitions, and the electronic device may adjust, based on a change of preset data according to a preset rule, content displayed in each partition in the card. In this way, the electronic device can display more information in the card, and information stacking can be avoided, thereby improving user experience.

With reference to some embodiments of the first aspect, in some embodiments, before the displaying a first interface, the method further includes: obtaining a first task planned by a user from a first application, where the first application is an application corresponding to the first card; and determining basic information and extended information of the first task. That the first region displays first content, and the second region displays second content specifically includes: The first region displays the basic information, and the second region displays the extended information.

According to the method provided in the foregoing embodiment, before displaying a card with partitions, the electronic device may determine a quantity of tasks that need to be displayed in the card, to determine content to be displayed in each of two partitions of the card. When there is only one task, a first region of the card displays basic information of the task, and a second region of the card displays extended information of the task.

With reference to some embodiments of the first aspect, in some embodiments, before the displaying a first interface, the method further includes: obtaining a second task and a third task planned by a user from a first application, where the first application is an application corresponding to the first card, and determining basic information of the second task and basic information of the third task. That the first region displays first content, and the second region displays second content specifically includes: The first region displays the basic information of the second task, and the second region displays the basic information of the third task.

According to the method provided in the foregoing embodiment, before displaying a card with partitions, the electronic device may determine a quantity of tasks that need to be displayed in the card, to determine content to be displayed in each of two partitions of the card. When there are a plurality of tasks, the electronic device may determine two tasks that need to be displayed from the plurality of tasks, and then display basic information of the two tasks in the two partitions of the card.

With reference to some embodiments of the first aspect, in some embodiments, the preset status data type includes one or more of user operation data, time data, location data, an SMS message, and cellular data, and the user operation data is data generated by a user operation detected by the electronic device.

According to the method provided in the foregoing embodiment, the electronic device may monitor one or more of user operation data, time data, location data, an SMS message, and cellular data, and determine, based on a change of the data, whether content in a card needs to be updated. In this way, the electronic device can automatically adjust, based on a status change of the user, the content displayed in the card, so that the user can obtain, in real time, information that the user most cares about currently.

With reference to some embodiments of the first aspect, in some embodiments, the obtaining first status data specifically includes: obtaining one or more of the time data, the location data, the SMS message, and the cellular data; and the adjusting, based on the first status data, the content displayed in the first region and/or the second region specifically includes: determining, based on one or more of the time data, the location data, the SMS message, and the cellular data, a preset situation in which the user is located; and replacing, with third content, the second content displayed in the second region, where the third content is content that is obtained based on the preset data type and that corresponds to the preset situation in which the user is located.

According to the method provided in the foregoing embodiment, the electronic device may determine, based on the time data, the location data, the SMS message, or the cellular data, whether a situation in which the user is located changes. When a change is detected, the electronic device may replace, with other extended information in a current situation, the extended information of the first task displayed in the second region. In this way, the content displayed in the second region can be updated in real time according to the situation in which the user is located, so that the user can obtain, in a timely manner, information that the user most cares about currently, thereby improving user experience.

With reference to some embodiments of the first aspect, in some embodiments, the obtaining first status data specifically includes: obtaining the user operation data; and the adjusting, based on the first status data, the content displayed in the first region and/or the second region specifically includes: if the user operation data is not obtained within a preset time period, increasing a display area of the first region, and displaying fourth content in the first region, where the fourth content includes the basic information of the second task and extended information of the second task.

According to the method provided in the foregoing embodiment, the electronic device may determine, based on whether a user operation performed on the card is detected, whether to adjust a size of the first region and a size of the second region, so as to adjust content displayed in each region. When a user operation performed on the card is not detected, the electronic device may adjust the size of the first region and the size of the second region according to a preset rule, to adjust content displayed in different regions, so as to display more information about one of the two displayed tasks.

With reference to some embodiments of the first aspect, in some embodiments, after the obtaining the user operation data, the method further includes: if the user operation data indicates that the electronic device detects, within a preset time period, a user operation performed on the first card, increasing a display area of a region in which the user operation is performed, and increasing content displayed in the region.

According to the method provided in the foregoing embodiment, the electronic device may alternatively adjust the size of the first region and the size of the second region based on a user operation, to adjust the content displayed in the two regions, so as to display more information about one of the two displayed tasks.

With reference to some embodiments of the first aspect, in some embodiments, the first card is a card for displaying a flight trip, the first task, the second task, and the third task are a plurality of flight trips arranged by the user; the basic information includes more than one of a flight number, a trip date, a departure place, a departure time, a destination, and an arrival time; and the extended information includes one or more of a check-in time, a check-in counter, a seat number, and a boarding gate.

According to the method provided in the foregoing embodiment, in a process of displaying a flight card, the electronic device may adjust, according to a preset rule, flight information displayed in two regions of the card, and may selectively display, according to a travel situation in which the user is located, information that the user cares about in a current situation. In this way, the user can quickly and accurately locate target information by using the card, to avoid a trip delay.

With reference to some embodiments of the first aspect, in some embodiments, the first card is a card for displaying a schedule, the first task is a schedule arranged by the user, the basic information includes a schedule occurrence date, and the extended information includes a planned schedule on the date.

According to the method provided in the foregoing embodiment, in a process of displaying a schedule card, the electronic device may determine, according to a current time, a schedule that the user most cares about, and then display the schedule in the second region. In this way, the user can quickly learn of a schedule plan of the user by using the schedule card.

According to a second aspect, an embodiment of this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method described in any one of the first aspect and the possible implementations of the first aspect.

According to a third aspect, an embodiment of this application provides a computer-readable storage medium, including instructions. When the instructions are run on an electronic device, the electronic device is enabled to perform the method described in any one of the first aspect and the possible implementations of the first aspect.

According to a fourth aspect, an embodiment of this application provides a computer program product including instructions. When the computer program product runs on an electronic device, the electronic device is enabled to perform the method described in any one of the first aspect and the possible implementations of the first aspect.

It may be understood that the electronic device provided in the second aspect, the computer storage medium provided in the third aspect, and the computer program product provided in the fourth aspect are all used to perform the method provided in embodiments of this application. Therefore, for beneficial effects that can be achieved, refer to the beneficial effects in the corresponding method. Details are not described herein again.

DESCRIPTION OF EMBODIMENTS

The terms used in the following embodiments of this application are merely intended to describe specific embodiments, but are not intended to limit this application.

A flight card is used as an example. A user may have a plurality of flight trips on one day. Two flights are used as an example. When the user has two flight trips on one day, a card usually first displays flight information of an earlier trip. When the earlier trip ends, the card displays flight information of the second trip.

For example, the user purchases two air tickets. Departure times of the two air tickets are January 9. The departure time of the first air ticket is in the morning on January 9, for example, 8:00 (this is briefly referred to as a first trip). The departure time of the second air ticket is 5:00 in the afternoon (this is briefly referred to as a second trip). In this case, for a flight card displayed on a mobile phone, refer to FIG. 1A and FIG. 1B.

Figure 1A:
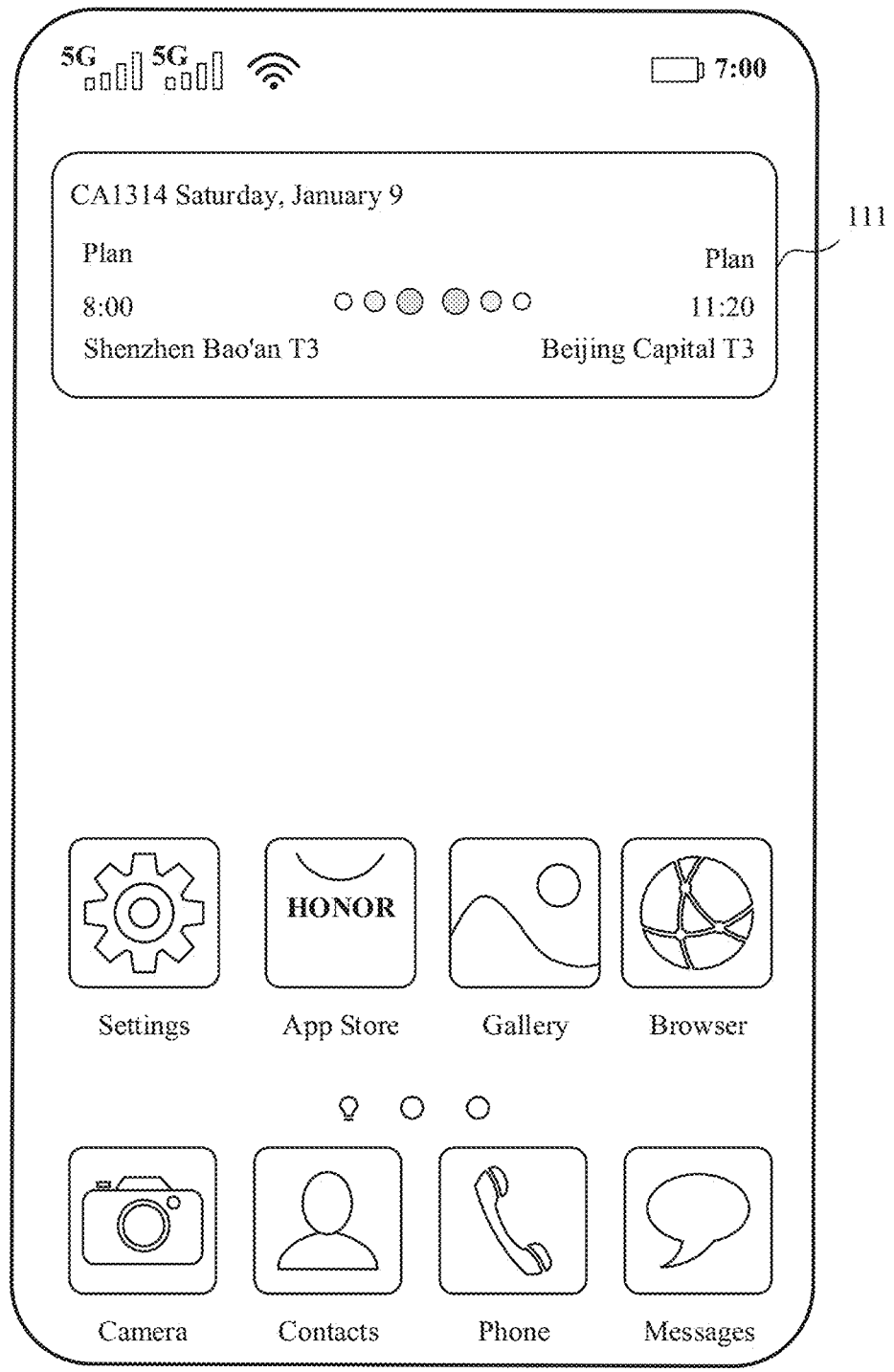
FIG. 1A to FIG. 1C show a group of user interfaces in which an existing electronic device displays a card according to an embodiment of this application.

As shown in FIG. 1A, a current time displayed in a user interface 11 is 7:00. For the foregoing two trips, the trip at 8:00 in the morning (the first trip) is closer. In this case, a card 111 may display flight information of the first trip, including a flight number ("CA1314"), a date ("January 9"), a departure place ("Shenzhen Bao'an T3"), a departure time ("8:00"), a destination ("Beijing Capital T3"), and an arrival time ("11:20").

Figure 1B:
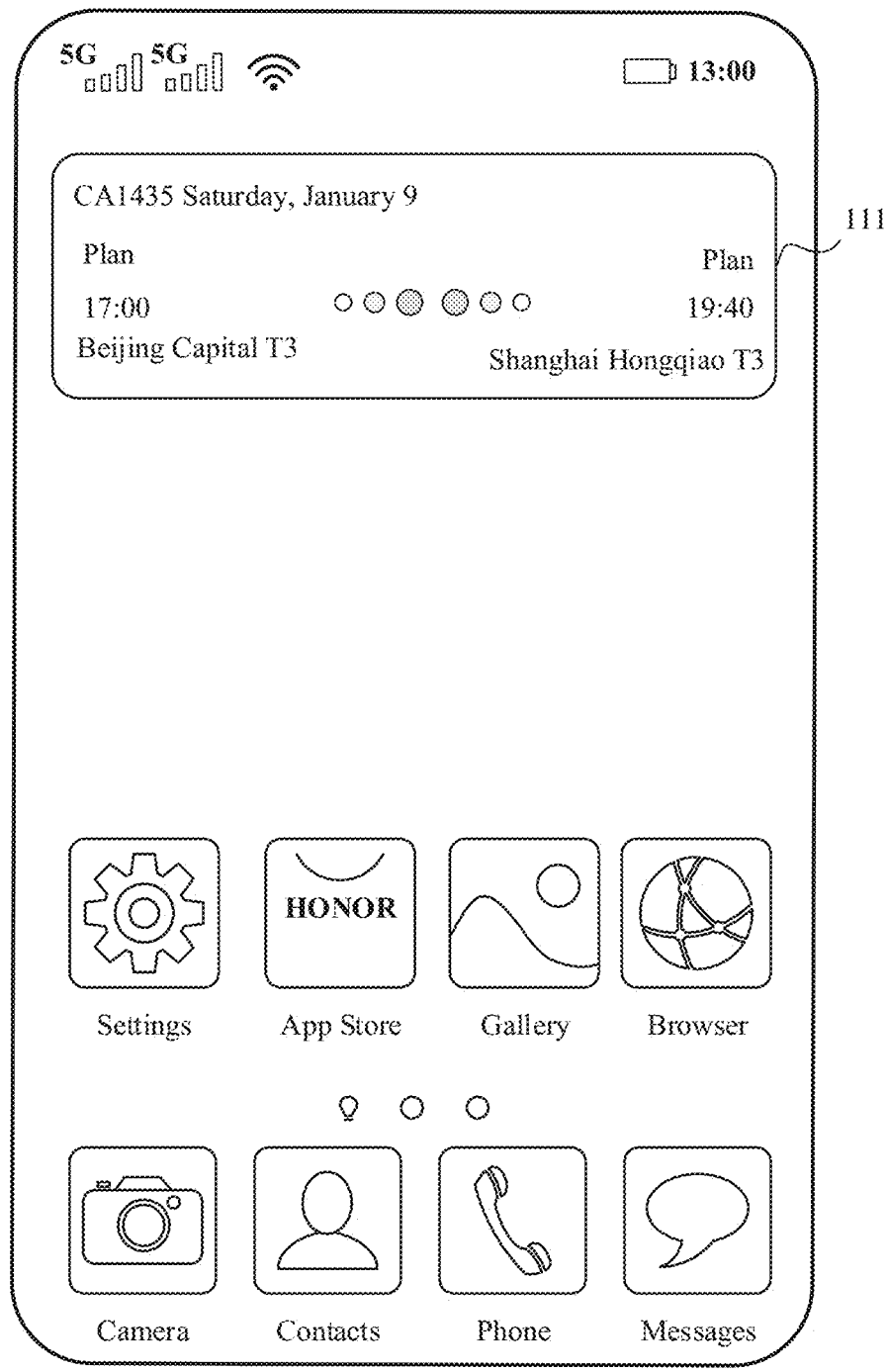

As shown in FIG. 1B, a current time displayed in a user interface 12 is 13:00. For the foregoing two trips, the trip at 5:00 in the afternoon (the second trip) is upcoming. In this case, the card 111 may display flight information of the second trip, for example, a flight number ("CA1435"), a date ("January 9"), a departure time ("17:00"), a departure place ("Beijing Capital T3"), an arrival time ("19:40"), and a destination ("Shanghai Hongqiao T3").

In this case, the user can quickly obtain the flight information of the second trip by using the card only after the first trip ends. As a result, duration in which the card displays the second trip is very short. When the user sees the second trip, there may be little time left for the user to prepare. In this case, the card does not implement a reminder function well.

Figure 1C:
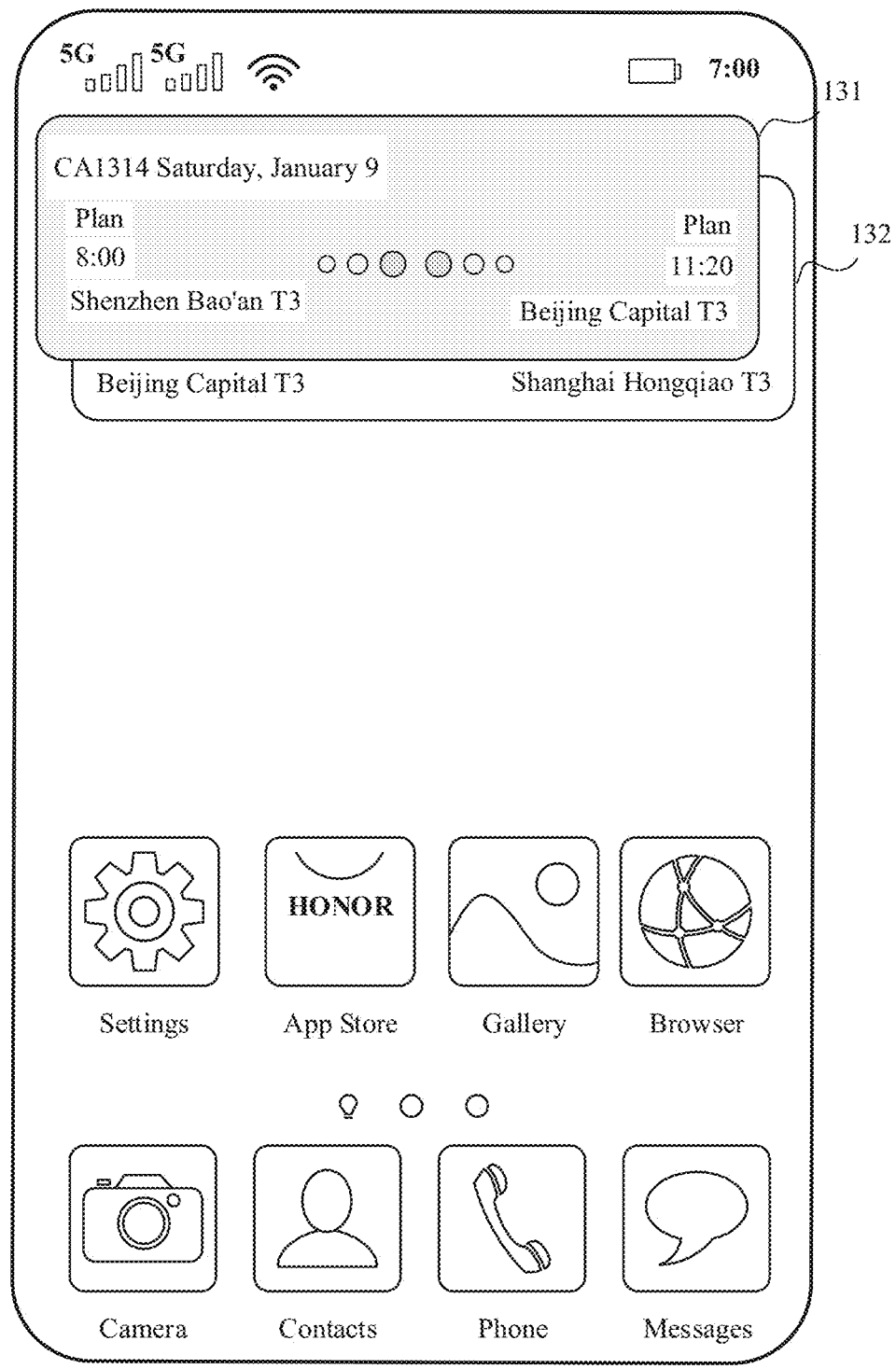

In another implementation, the mobile phone may alternatively display two overlapping cards. The two cards separately display the foregoing two trips. In the two cards, a card displaying the earlier flight may be placed at atop layer. A card displaying the later flight may be stacked at a bottom layer. As shown in FIG. 1C, a card 131 may display flight information of the first trip. A card 132 may display flight information of the second trip.

In the method shown in FIG. 1C, although the user can simultaneously see the two flight trips on the same day, the user cannot intuitively obtain information about the two flight trips. For example, the user needs to perform an operation such as card switching.

To enable a card to display more information and ensure that a user can intuitively obtain information in the card, an embodiment of this application provides a dynamic card display method. The method may be applied to electronic devices such as a mobile phone and a tablet computer. In this embodiment of this application, a mobile phone is used as an example below to describe the dynamic card display method.

In the method provided in this embodiment of this application, the mobile phone may divide a card into two partitions: a left partition and a right partition. The two partitions may display tasks in a same application relatively independently. When there are a plurality of tasks in the application, the two partitions may separately display different tasks. For example, the left partition may display one task of the application, and the right partition may display another task of the application. When there is only one task in the application, the left partition may display basic information of the task, and the right partition may display extended information of the task.

When a plurality of tasks are displayed in the card, the mobile phone may adjust sizes of the left and right partitions according to a preset rule, to display more information. For example, the left partition is expanded and the right partition is reduced, or the right partition is expanded and the left partition is reduced. When one task is displayed in the card, the mobile phone may split to-be-displayed information of the task into different parts. Then, the information is selectively displayed according to a situation in which the user is currently located.

In a flight card, the foregoing task may refer to a flight trip arranged by the user. In a schedule card, the foregoing task may refer to a schedule of the user.

In the dynamic card display method provided in this embodiment of this application, the user can obtain more information from the card, and a problem that information is not obtained intuitively due to information stacking is avoided.

Not limited to a mobile phone or a tablet computer, an electronic device (an electronic device 100) that implements this method may alternatively be a notebook computer, a virtual reality (virtual reality, VR) device, a wearable device, a vehicle-mounted device, a smart home device, a smart city device, and/or the like. A specific type of the electronic device is not specially limited in this embodiment of this application.

With reference to a group of user interfaces shown as an example in FIG. 2A to FIG. 2D, the following describes a method in which a card separately displays different tasks in a left partition and a right partition.

Figure 2A:
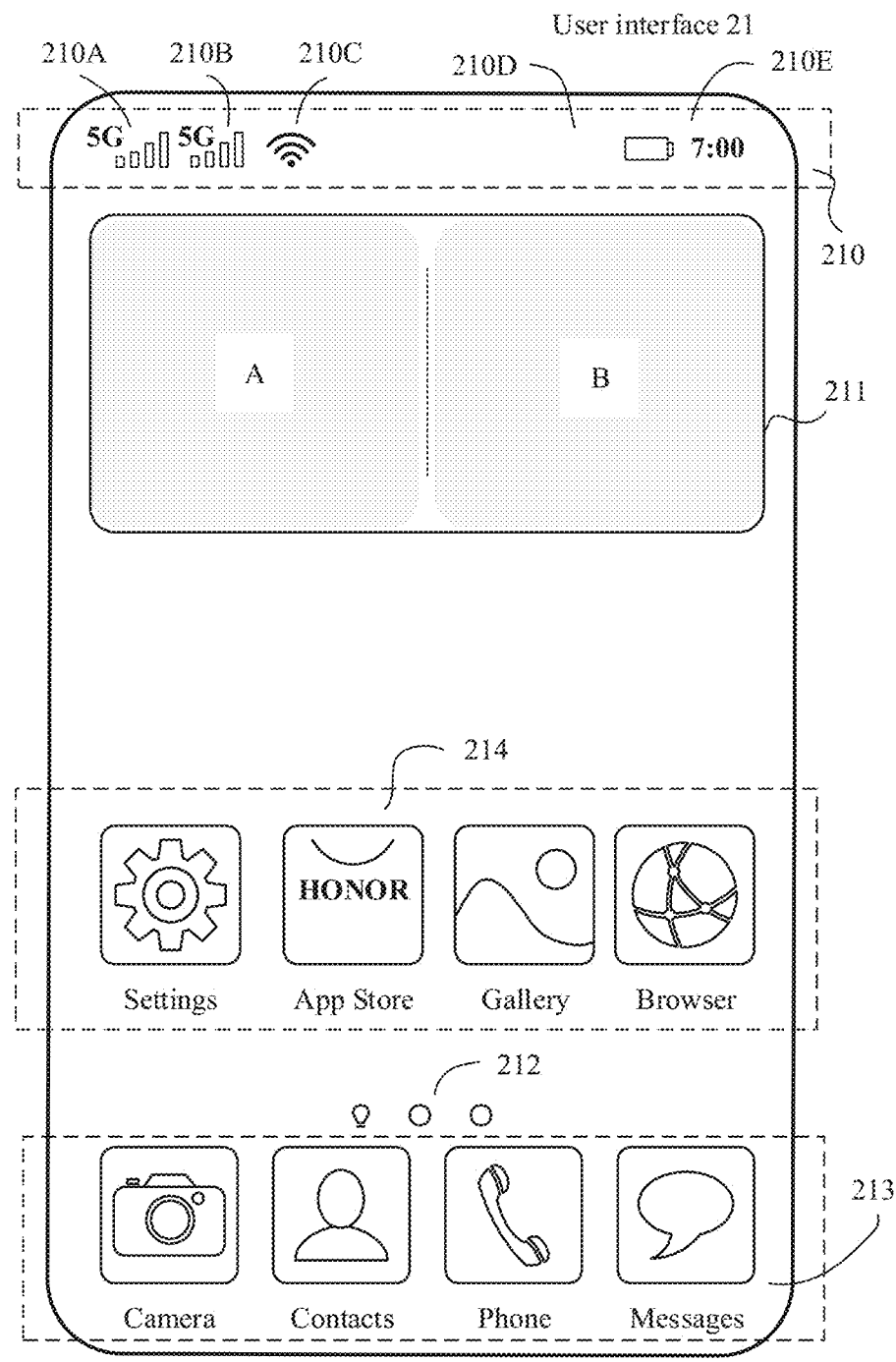
FIG. 2A to FIG. 2D show a group of user interfaces in which an electronic device displays a card according to an embodiment of this application.

FIG. 2A shows an example of a card displayed on a mobile phone and partitions of the card. As shown in FIG. 2A, a user interface 21 includes a card 211. The card 211 includes two partitions: a left partition and a right partition. The left partition may be referred to as a region A. The right partition may be referred to as a region B.

The user interface 21 may further include a status bar 210, a page indicator 212, a frequently used application icon tray 213, and a plurality of other application icons 214.

The status bar may include one or more signal strength indicators (for example, a signal strength indicator 210A and a signal strength indicator 210B) of mobile communication signals (which may also be referred to as cellular signals), a wireless fidelity (wireless fidelity, Wi-Fi) signal strength indicator 210C, a battery level indicator 210D, and a time indicator 210E.

The page indicator 212 may be used to indicate a location relationship between a currently displayed page and another page.

The frequently used application icon tray 213 may include a plurality of tray icons (for example, a Camera icon, a Contacts icon, a Phone icon, and a Messages icon), and the tray icons remain displayed during page switching. The tray icons are optional. This is not limited in this embodiment of this application.

There may be a plurality of other application icons 214, for example, a Settings icon, an App Store icon, a Gallery icon, and a Browser icon. The other application icons further include a third-party application icon, such as a WeChat icon.

The other application icons 214 may be distributed on a plurality of pages, and the page indicator may be further used to indicate a specific page in which a user currently browses applications. The user may slide leftward or rightward in a region of the other application icons to browse application icons on another page.

In the user interface 21, an interface in which the mobile phone displays the card 211 is a home page (home page) of the mobile phone. Not limited to the home page, the card 211 may alternatively be placed on another user interface such as the leftmost screen of the mobile phone. Herein, the leftmost screen refers to a leftmost page of the mobile phone. A location at which the card is placed is not limited in this embodiment of this application.

In a scenario of displaying flight information, the card 211 shown in FIG. 2A may be a flight card. The region A may display one trip planned by the user. The region B may display another trip. For example, the region A may display a first trip (the trip at 8:00 in the morning in FIG. 1A), and the region B may display a second trip (the trip at 5:00 in the afternoon in FIG. 1B), as shown in FIG. 2B.

Figure 2B:
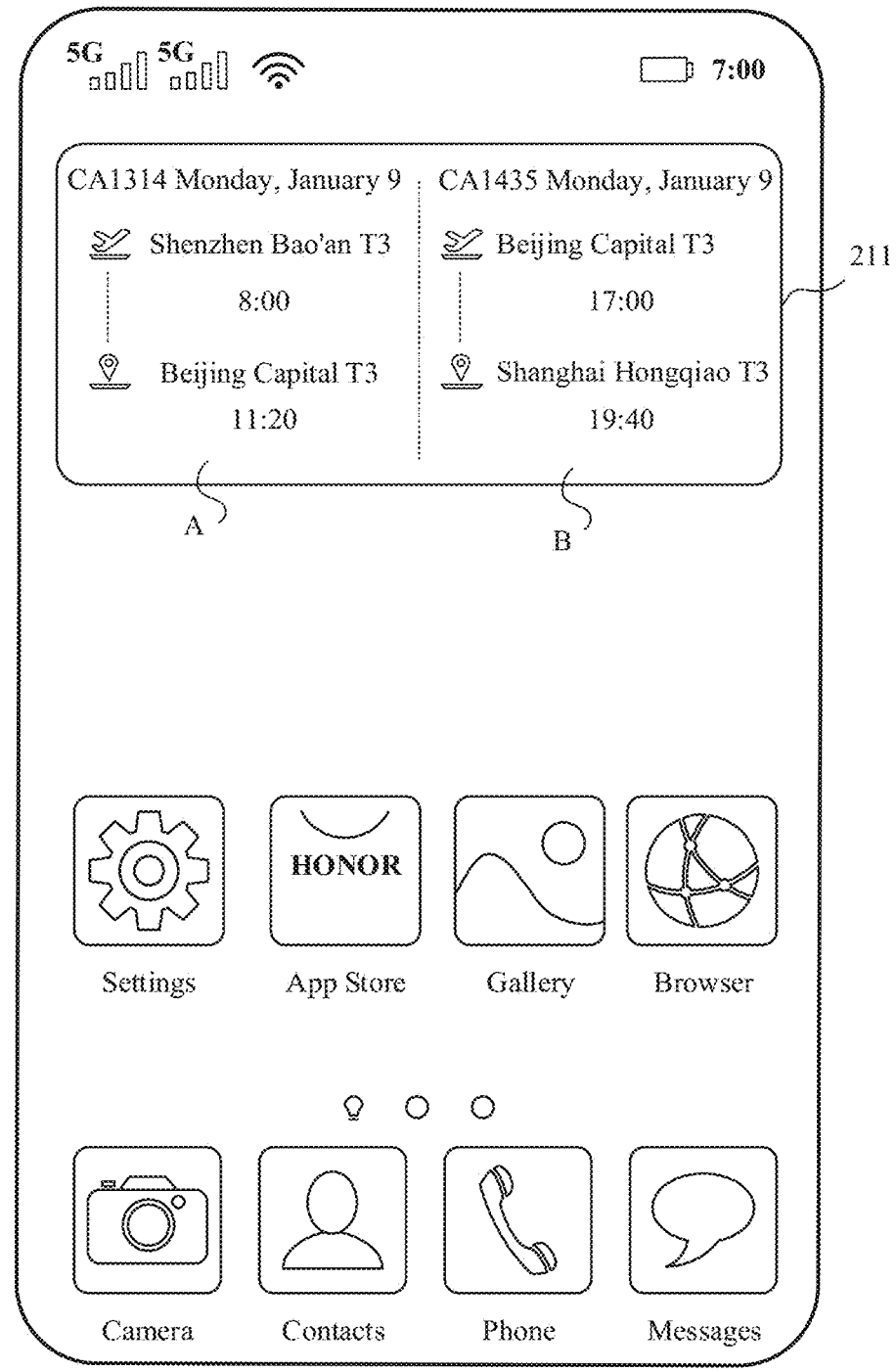

FIG. 2B shows a user interface 22 in which one flight card displays two trips.

As shown in FIG. 2B, the user interface 22 may include the card 211. The region A of the card 211 displays the first trip planned by the user. The region B of the card 211 displays the second trip planned by the user.

In this case, information about the first trip displayed in the region A includes a flight number ("CA 1314"), a date ("January 9"), a departure place ("Shenzhen Bao'an T3"), a departure time ("8:00"), a destination ("Beijing Capital T3"), and an arrival time ("11:20"). Information about the second trip displayed in the region B includes a flight number ("CA1435"), a date ("January 9"), a departure place ("Beijing Capital T3"), a departure time ("17:00"), a destination ("Shanghai Hongqiao T3"), and an arrival time ("19:40").

The flight number, the date, the departure place, the departure time, the destination, and the arrival time may be referred to as basic information of a flight.

In this case, the card 211 may be referred to as a card in a state in which a plurality of tasks are equal. To be specific, sizes of the region A and the region B in the card 211 are equal, and an amount of trip information displayed in the region A is equal to an amount of trip information displayed in the region B.

Before the mobile phone is in the state in which a plurality of tasks are equal, the mobile phone may display another user interface or may be in a lock-screen state. In a scenario in which the mobile phone displays another user interface, the user may perform a gesture operation such as leftward sliding, rightward sliding, or exiting in the user interface. In response to the user operation, the mobile phone may display the user interface 22 shown in FIG. 2B. In a scenario in which the mobile phone is in a lock-screen state, the mobile phone may detect an unlock operation of the user. In response to the operation, the mobile phone may also display the user interface 22 shown in FIG. 2B.

After entering the state in which a plurality of tasks are equal, that is, after displaying the card 211 shown in FIG. 2B, the mobile phone may detect whether there is a user operation performed on the card 211. If a user operation performed on the card 211 is not detected within a preset time period, the mobile phone may display a user interface 23 shown in FIG. 2C. The preset time period is, for example, 2 seconds.

Figure 2C:
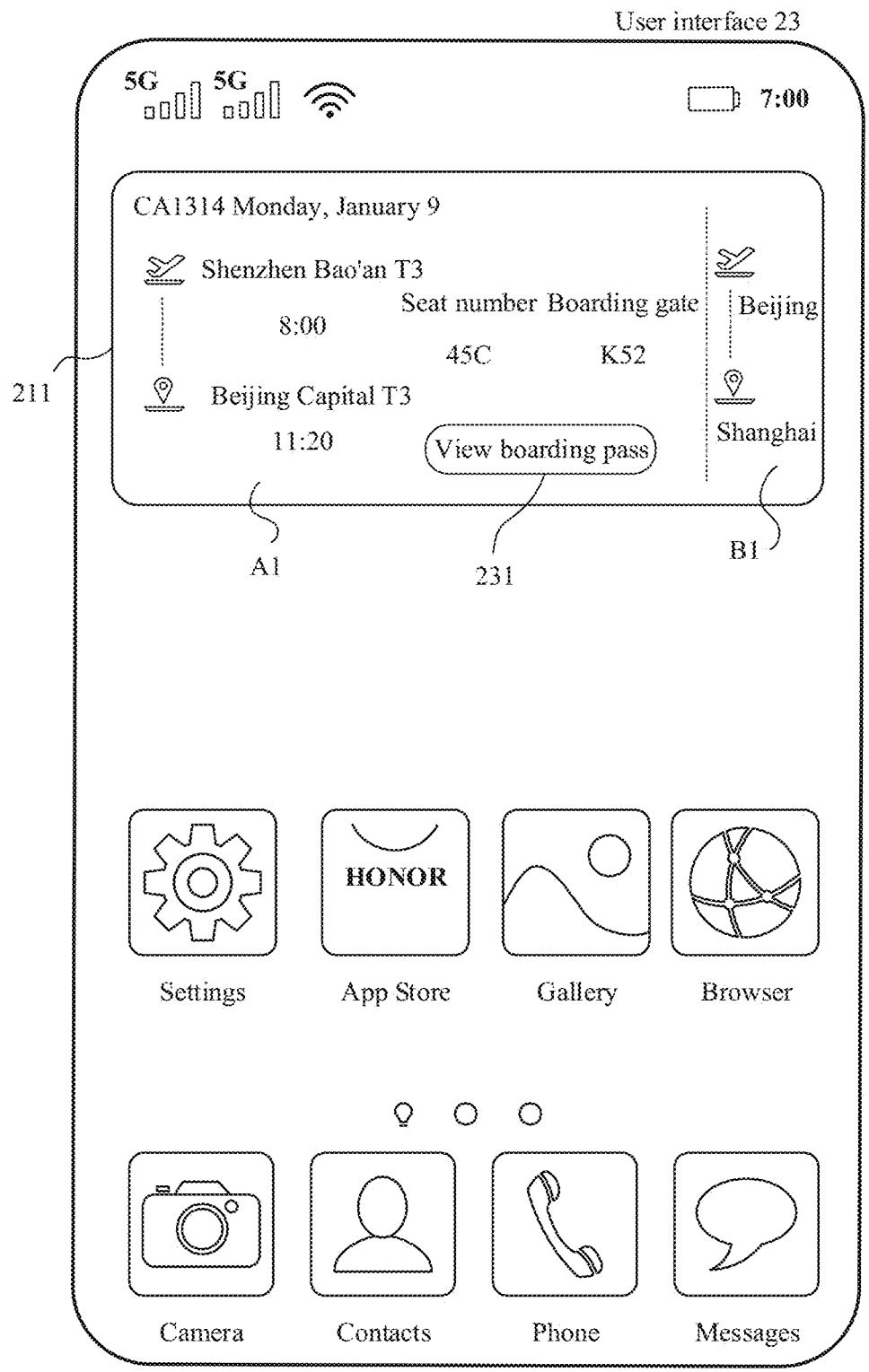

In other words, within 2 seconds after the user interface 22 is displayed, if the mobile phone does not detect a user operation performed on the card 211 in the interface, the mobile phone may display the user interface 23 shown in FIG. 2C.

In the user interface 23, the card 211 may include a region A1 and a region B1. The region A1 is obtained after the region A is expanded. The region B1 is obtained after the region B is reduced. The region A1 may display more information than the region A. On the contrary, information displayed in the region B1 is reduced.

Specifically, in addition to the foregoing basic information (the flight number, the date, the departure place, the departure time, the destination, and the arrival time), the region A1 may further display information such as a seat number ("45C") and a boarding gate ("K52"). The seat number and the boarding gate may be referred to as extended information of the flight.

The region A1 may further include a button 231. When the mobile phone detects a user operation performed on the button 231, the mobile phone may display an electronic boarding pass of the flight in response to the operation.

Expansion of the region A1 causes reduction of the region B1. Therefore, content that can be displayed in the region B1 is limited. For example, the region B1 can display only the departure place ("Beijing") and the destination ("Shanghai") of the flight, or less content.

In this case, the card 211 may be referred to as a card in a state in which a task A is superior. In other words, in the card 211, the region A is expanded and the region B is reduced. An amount of trip information displayed in the region A is greater than an amount of trip information displayed in the region B.

When the card 211 is in the state in which the task A is superior, the region A may display extended information of the first trip. In this way, the user can obtain more information about the first trip from the region A, and the user does not need to complete a specific operation on the mobile phone.

After the card shown in the user interface 22 (the card in the state in which a plurality of tasks are equal) is displayed, if a user operation performed on the region A is detected within a preset time period, the mobile phone may display the user interface 23 shown in FIG. 2C. The user operation is, for example, a tap operation or a rightward slide operation. This is not limited in this embodiment of this application.

When the card in the state in which the task A is superior is displayed, the mobile phone may continue to detect whether there is a user operation performed on the card 211. If a user operation performed on the card 211 is not detected within a preset time period, the mobile phone may display the user interface 22 shown in FIG. 2B, that is, restore the state in which a plurality of tasks are equal.

In this way, after detecting that the user has obtained more information about the first trip from the region A, the mobile phone may automatically restore the state in which a plurality of tasks are equal, and re-display the basic information of the first trip and the second trip.

If a user operation performed on the region B1 is detected within a preset time period, in response to the operation, the mobile phone may display a user interface 24 shown in FIG.

2D, that is, expand the region B1 of the card 211, to display more information about the second trip.

Figure 2D:
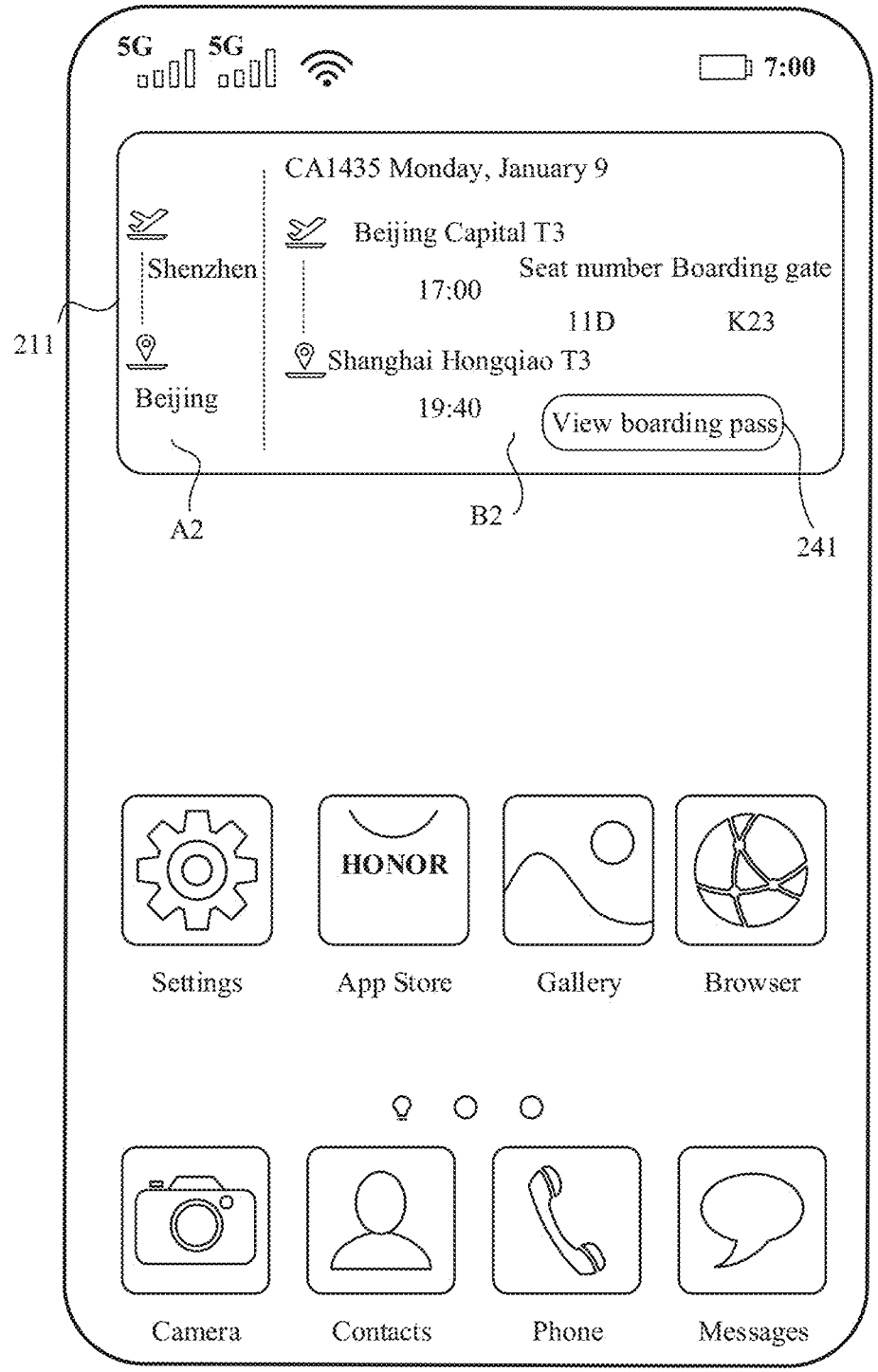

As shown in FIG. 2D, the card 211 may include a region A2 and a region B2. The region A2 is obtained after the region A1 (or A) is reduced. The region B2 is obtained after the region B1 (or B) is expanded. The region A2 may display less information than the region A1 (or A). Correspondingly, information displayed in the region B2 increases.

The expanded region B2 may not only display the basic information of the second trip, but also display extended information of the second trip. For example, the region B2 may further display a seat number ("11D") and a boarding gate ("K23") of the flight trip. The region B2 may also include a button 241 for viewing an electronic boarding pass.

Similarly, expansion of the region B2 causes reduction of the region A2. Therefore, content that can be displayed in the region A2 is limited. For example, the region A2 can display only the departure place ("Shenzhen") and the destination ("Beijing") of the flight, or less content.

In this case, the card 211 may be referred to as a card in a state in which a task B is superior. In other words, in the card 211, the region B is expanded and the region A is reduced. An amount of trip information displayed in the region B is greater than an amount of trip information displayed in the region A.

When the card 211 is in the state in which the task B is superior, the region B may display extended information of the second trip. In this way, when the user wants to obtain more information about the second trip, the user may obtain the information from the expanded region B, and does not need to open a specific application (for example, an application corresponding to the later purchased air ticket). This reduces a user operation, and improves user experience.

After the card shown in the user interface 22 (the card in the state in which a plurality of tasks are equal) is displayed, if a user operation performed on the region B is detected within a preset time period, the mobile phone may display the user interface 24 shown in FIG. 2D, that is, expand the region B of the card 211, to display more information about the second trip.

When the card in the state in which the task B is superior is displayed, the mobile phone may continue to detect whether there is a user operation performed on the card 211. If a user operation performed on the card 211 is not detected within a preset time period, the mobile phone may display the user interface 22 shown in FIG. 2B, that is, restore the state in which a plurality of tasks are equal.

In this way, after detecting that the user has obtained more information about the second trip from the region B, the mobile phone may automatically restore the state in which a plurality of tasks are equal, and re-display the basic information of the first trip and the second trip.

When a user operation performed by the user on the region A2 is detected within a preset time period, the mobile phone may display the user interface 23 shown in FIG. 2C, that is, expand the region A2 of the card 211, to display more information about the first trip.

It may be understood that, in the state in which a plurality of tasks are equal, because a priority of the task in the region A is higher than that of the task in the region B, the mobile phone first expands the region A to enter the state in which the task A is superior. In this embodiment of this application, the flight trip displayed in the region A is prior to the flight trip displayed in the region B.

Preferably, the mobile phone displays a task with a higher priority in a left region (that is, the region A) of the card, and displays a task with a lower priority in a right region (that is, the region B) of the card. In another embodiment, the mobile phone may alternatively display a task with a higher priority in the right region (that is, the region B). This is not limited in this embodiment of this application.

Correspondingly, if the task in the region B has a higher priority, when a user operation performed by the user on the user interface 22 is not detected, the mobile phone may first display the card in the state in which the task B is superior.

FIG. 2A to FIG. 2D show user interfaces in which the mobile phone displays two tasks in one card. In the method shown in FIG. 2A to FIG. 2D, the mobile phone may divide one flight card into two partitions: a left partition and a right partition. The two partitions may separately display different flight trips. In addition, during partition-based display, the card may automatically adjust sizes of the two partitions, to adjust content that can be displayed in each partition.

In this way, when the user has two trips on one day, the user can simultaneously learn of the two trips from one flight card. Further, based on dynamic display of the card, the user may further obtain more information from the card, and no additional user operation is required.

It may be understood that when the user has more than two trips on one day, the mobile phone may choose to preferentially display two earliest trips. A reason is that an earlier trip has a higher priority and the user cares more about the earlier trip.

Not limited to the flight card shown in FIG. 2A to FIG. 2D, the mobile phone may also divide a high-speed railway card into two partitions. Each partition may display one trip of the user. Similarly, the mobile phone may also automatically adjust a size of each partition according to a preset rule, to display more information about a high-speed railway trip.

When a user has only one task (flight trip), left and right partitions of a card may separately display basic information and extended information of the task. FIG. 3A to FIG. 3G show user interfaces in which different information of one task is displayed in left and right partitions of a card.

Figure 3A:
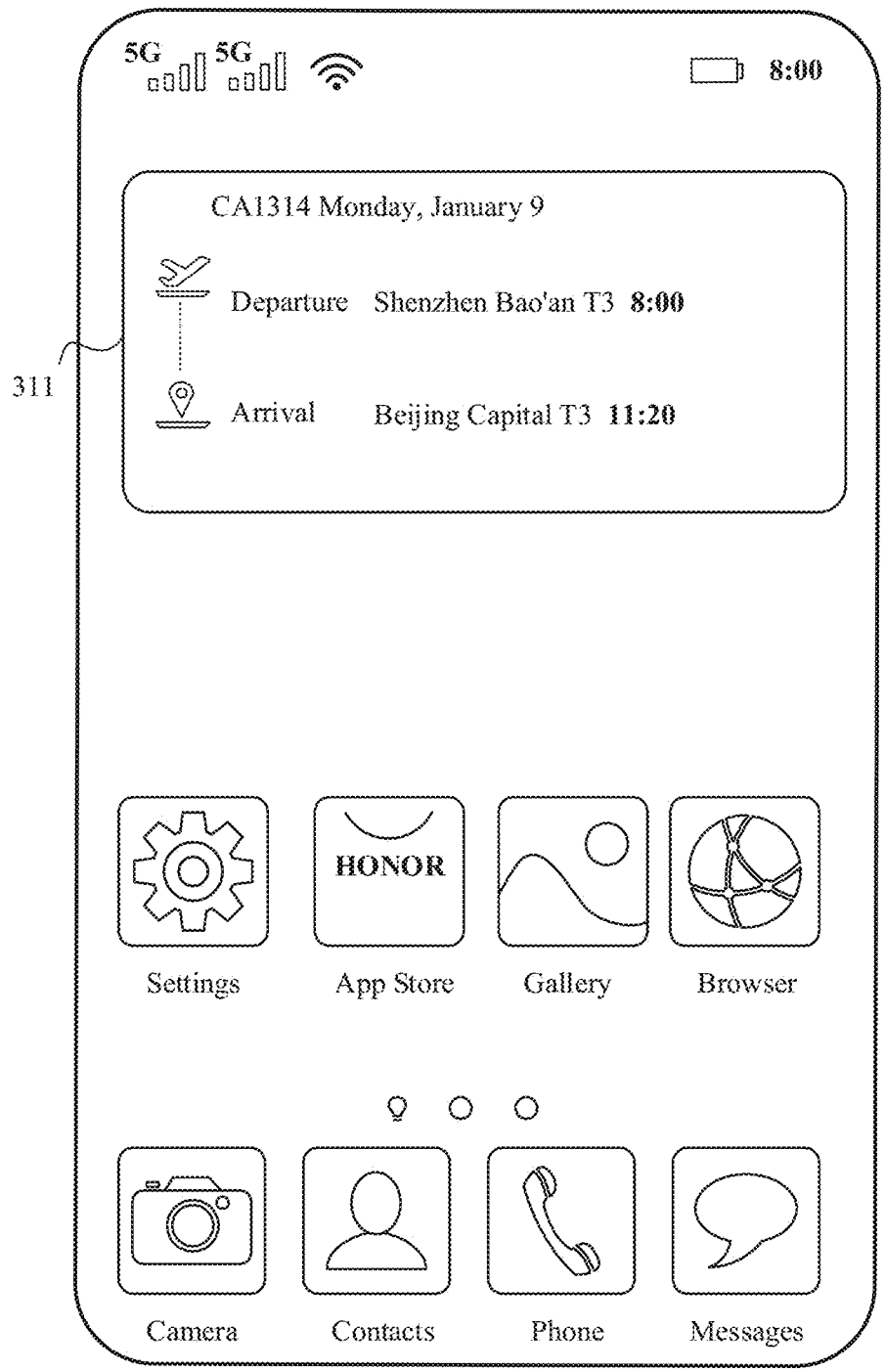
FIG. 3A to FIG. 3H show a group of user interfaces in which an electronic device displays a card according to an embodiment of this application.

As shown in FIG. 3A, a user interface 31 may include a card 311. The card 311 displays a flight trip of a user from the Shenzhen Bao'an airport at 8:00 in the morning on January 9. Information displayed in the card 311 includes a flight number ("CA1314"), a date ("January 9"), a departure place ("Shenzhen Bao'an T3"), a departure time ("8:00"), a destination ("Beijing Capital T3"), and an arrival time ("11:20").

After displaying the card 311 shown in the user interface 31, a mobile phone may detect whether a check-in time arrives. When the check-in time approaches, the mobile phone may display a user interface 32 shown in FIG. 3B.

In the user interface 32, the card 311 may be updated to a card 312. The card 312 may include a region A and a region B. The region A may display basic information of the trip, including the flight number, the date, the departure place, the departure time, the destination, and the arrival time. The region B may display the check-in time, for example, "Expected check-in start time: 18:00 Today".

In this case, the region B may display the check-in time, to notify the user of the time for checking in. After the user sees the card 312 shown in FIG. 3B, the user can learn of the specific time for checking in, to avoid specially querying the check-in time or avoid missing the check-in because the user does not know the check-in time.

When it is detected that the check-in has started, the card 312 may update content displayed in the region B. For an updated card 312, refer to FIG. 3C.

Figure 3B:
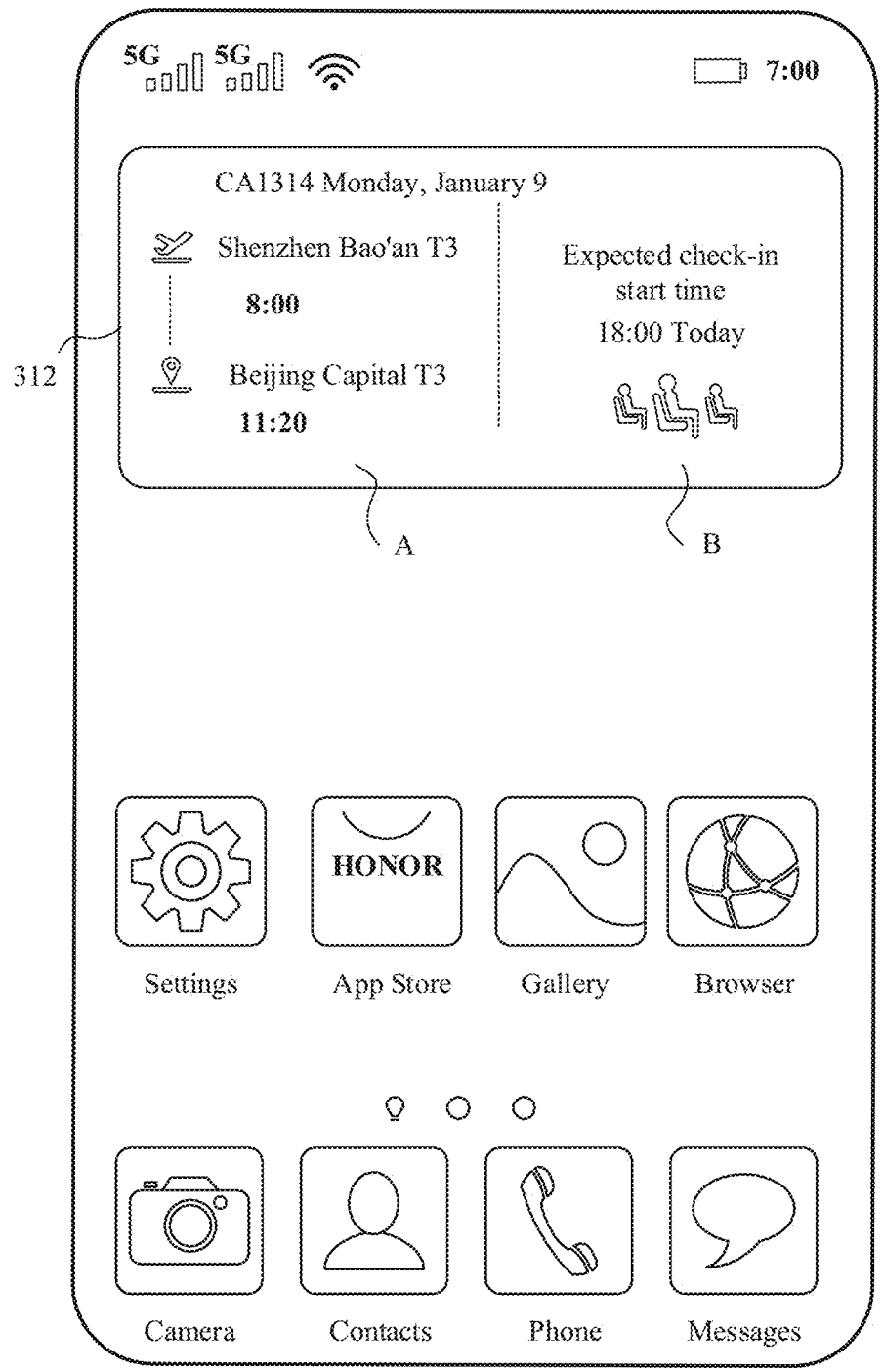
Figure 3C:
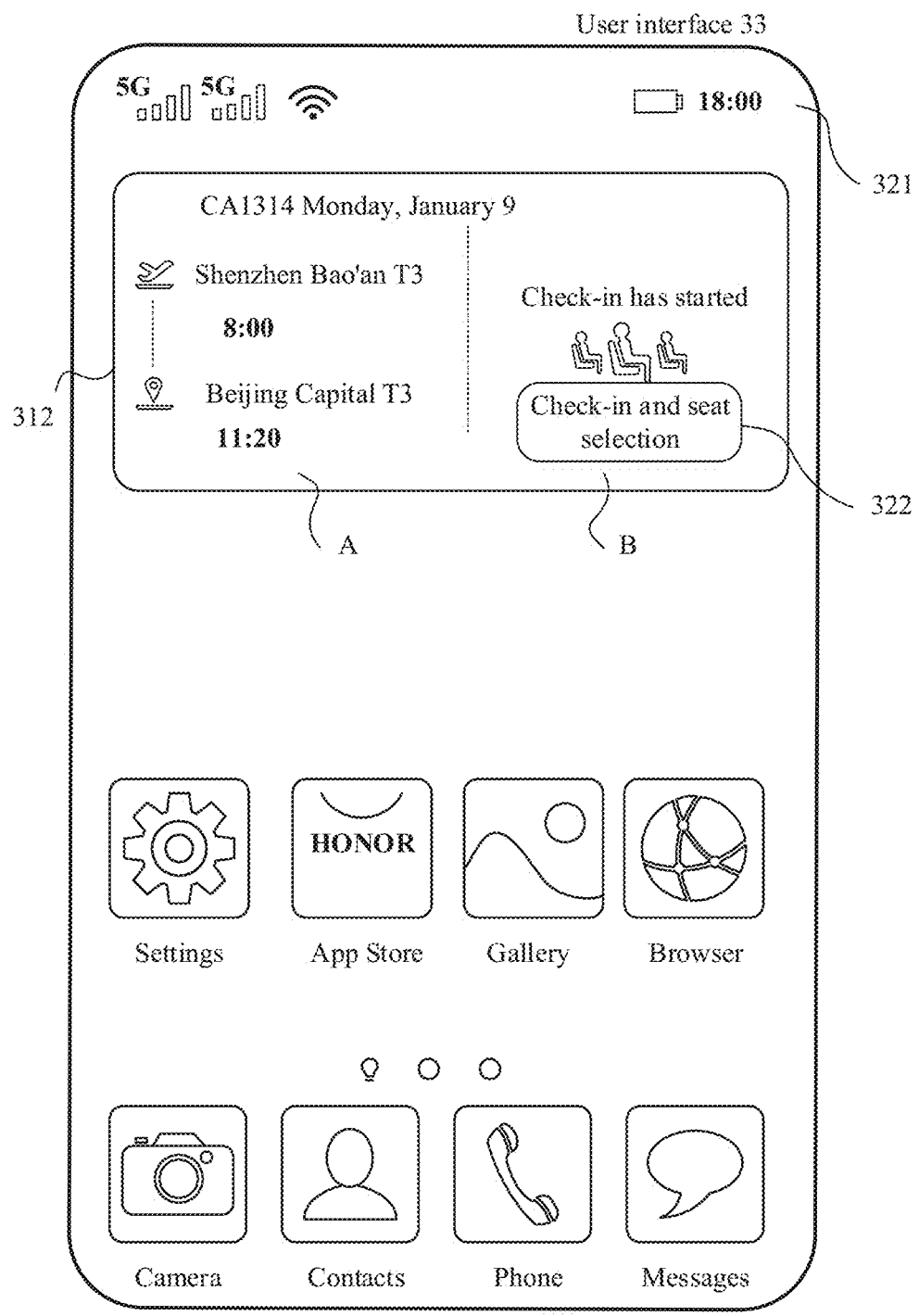

As shown in FIG. 3C, a time indicator 321 indicates that a current time is "18:00". In this case, the airline has opened a check-in channel. The region B of the card 312 may display a prompt message "Check-in has started" and a button 322 after the check-in channel is opened. When a user operation performed on the button 322 is detected, in response to the operation, the mobile phone may display a user interface for checking in. The user interface for the user to check in is not limited in this application.

After seeing the card 312 shown in FIG. 3C, the user can learn that check-in can be performed currently. Further, the user may check in by using the button 322.

Figure 3D:
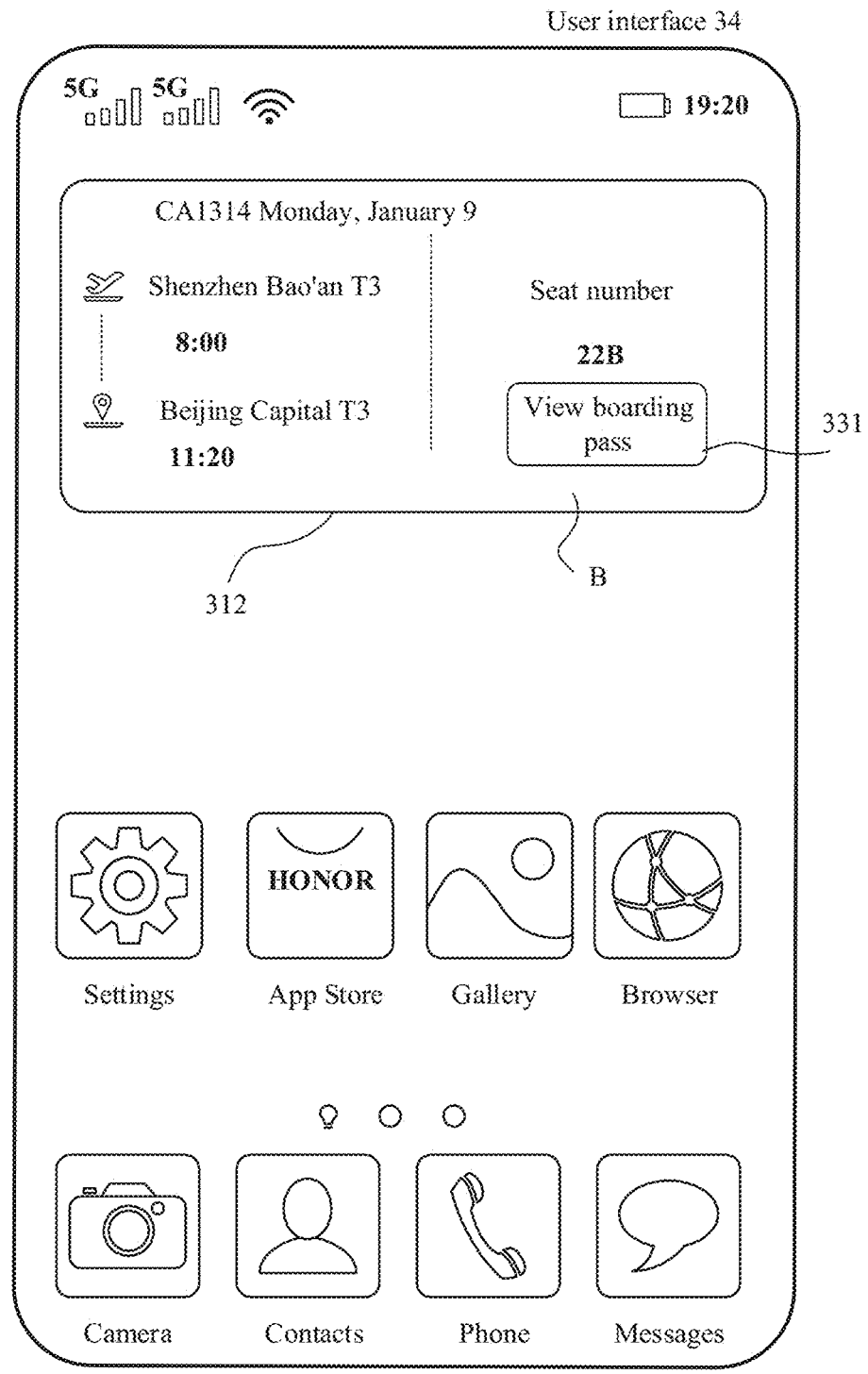

After the user checks in, the mobile phone may display a user interface 34 shown in FIG. 3D. In the user interface 34, the card 312 may update the content displayed in the region B. Specifically, the region B may display a seat number selected by the user during check-in, for example, "Seat number 22B". The region B may further include a button 331. When a user operation performed on the button 331 is detected, the mobile phone may display an electronic boarding pass of the user in response to the operation. A specific shape or style of the electronic boarding pass is not limited in this application.

Figure 3E:
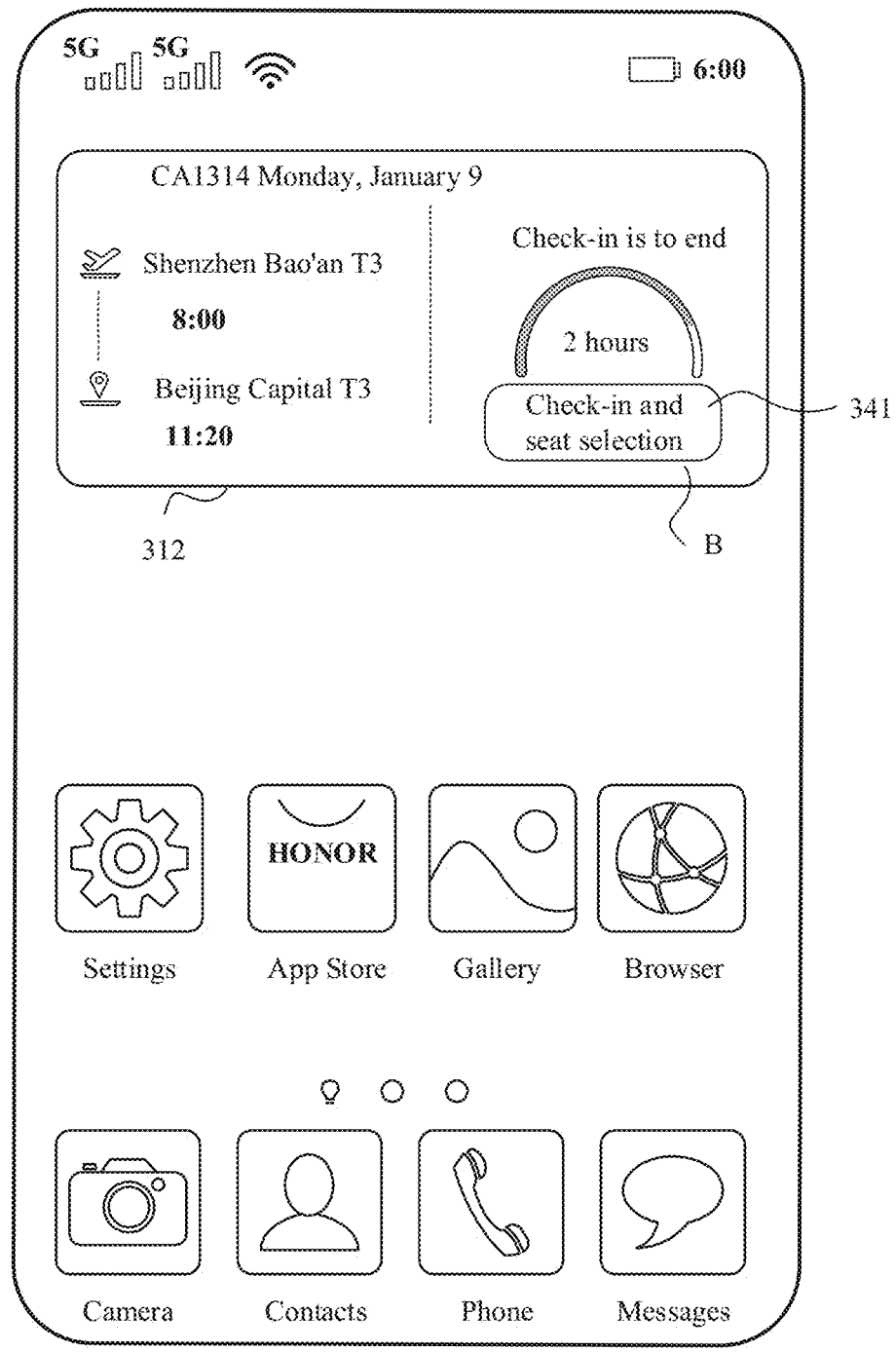
Figure 3F:
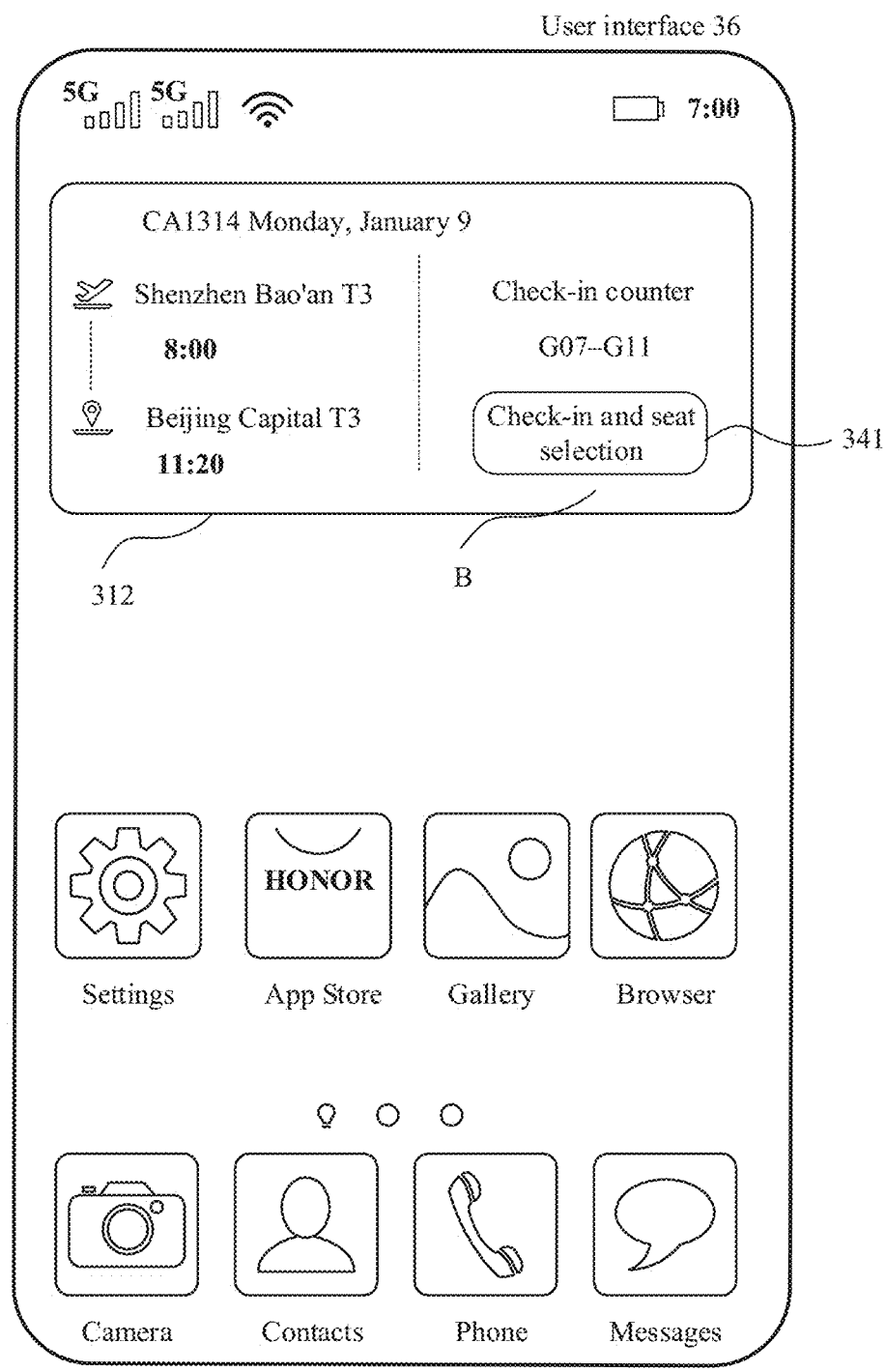
Figure 3G:
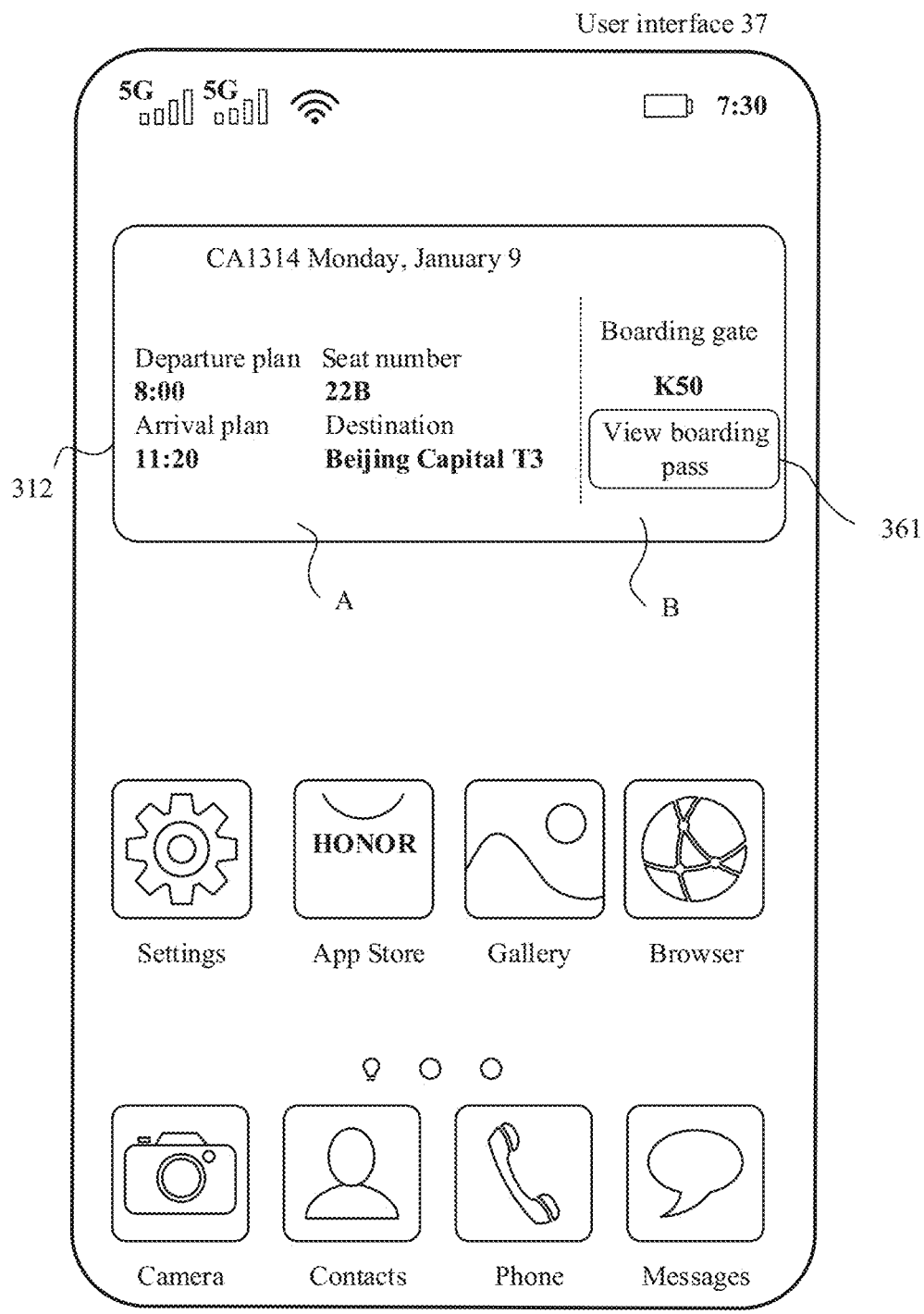

After the user interface shown in FIG. 3D is displayed, if it is detected that the user arrives at a departure airport, the mobile phone may display a user interface shown in FIG. 3G. Detailed description is not provided herein.

It is assumed that the user does not perform a check-in operation after the user interface 33 shown in FIG. 3C is displayed. When a check-in end time approaches, the mobile phone may display, in the region B, a prompt message indicating that check-in is to end. As shown in FIG. 3E, the region B may display "Check-in is to end in 2 hours". In this case, when the user sees a flight card shown in a user interface 35, the user can immediately learn of "Check-in is to end". Then, the user may perform a check-in operation to complete check-in.

The region B may further include a button 341. The user may perform a check-in operation by using the button 341. When a user operation performed on the button 341 is detected, in response to the operation, the mobile phone may display a user interface for checking in.

In this way, when the check-in end time approaches, the mobile phone can further emphasize the check-in prompt, so that the user can intuitively and clearly see the prompt.

The mobile phone may detect whether the user arrives at the departure airport. If it is detected that the user has arrived at the departure airport and the user still does not check in, the region B of the card 312 may display information about a check-in counter. As shown in FIG. 3F, the region B may display "Check-in counter G07 to G11". In this case, when the user sees the card 311, the user can learn of a specific counter for checking in.

In addition, the region B may continue to display the button 341 in the user interface 34. Then, after the user learns of the counter for checking in, the user can still choose to check in by using an online channel provided by the button 341.

If it is detected that the user has completed check-in (which may be completed at the counter or by using the button 341), and location data obtained by the mobile phone indicates that the user is within a geographical range of the departure airport, that is, the user arrives at the departure airport, the mobile phone may display a card 312 shown in FIG. 3G. In this case, content displayed in the card 312 is content that the user cares about in a boarding process.

For example, trip information displayed in the region A may include the departure time ("8:00"), the arrival time ("11:20"), the seat number ("22B"), and the destination ("Beijing Capital T3"). The region B may display a boarding gate ("K50").

The region B may further include a button 361. When a user operation performed on the button 361 is detected, the mobile phone may display an electronic boarding pass of the user in response to the operation.

Figure 3H:
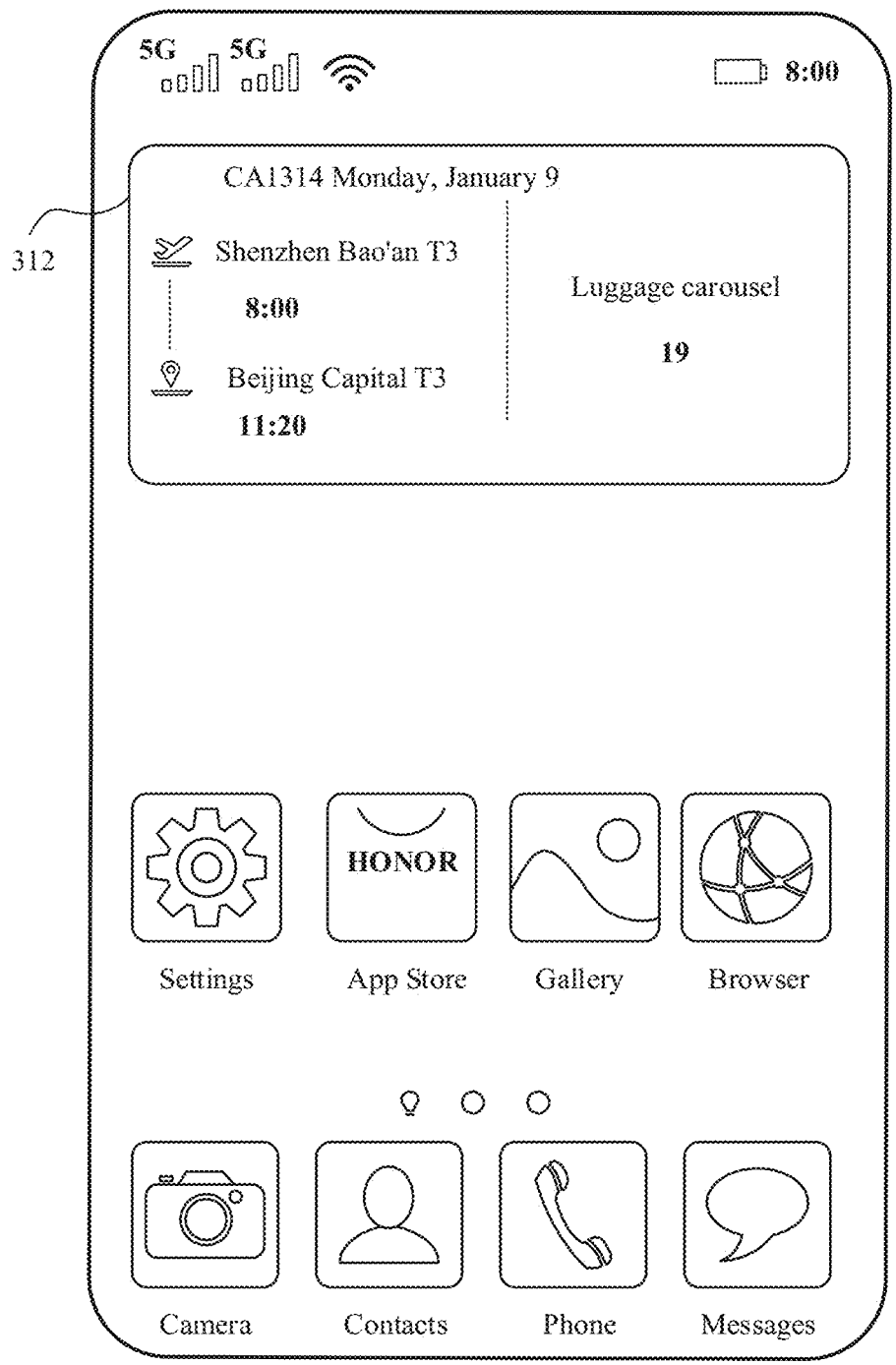

When detecting that the user arrives at the destination, the mobile phone may display a user interface 38 shown in FIG. 3H. In the user interface 38, the region B of the card 312 may display a carousel for user's luggage, for example, "Carousel 19". In this way, after arriving at the destination, the user can conveniently and quickly determine a location of the luggage by using the card shown in FIG. 3H, so as to correctly retrieval the luggage at the specified location.

FIG. 3A to FIG. 3G show a scenario in which the mobile phone displays one task in one card. In this case, the mobile phone may split information about the task to be displayed. Then, according to a current situation, the mobile phone may selectively display information that the user most cares about. In this way, the card can display more information, and the information that the user most cares about in the current situation can be conveniently and quickly located, to avoid information stacking.

Similarly, not limited to the flight card shown in FIG. 3A to FIG. 3G, the mobile phone may also split information in a high-speed railway trip according to a high-speed railway travel scenario. Then, according to a situation in which the user is located, the mobile phone may selectively display information that the user cares about in the current situation. For example, in a ticket checking process, a ticket entrance may be displayed in the right region of the card. After ticket checking, the seat number and the like may be displayed in the right region of the card.

Figure 4A:
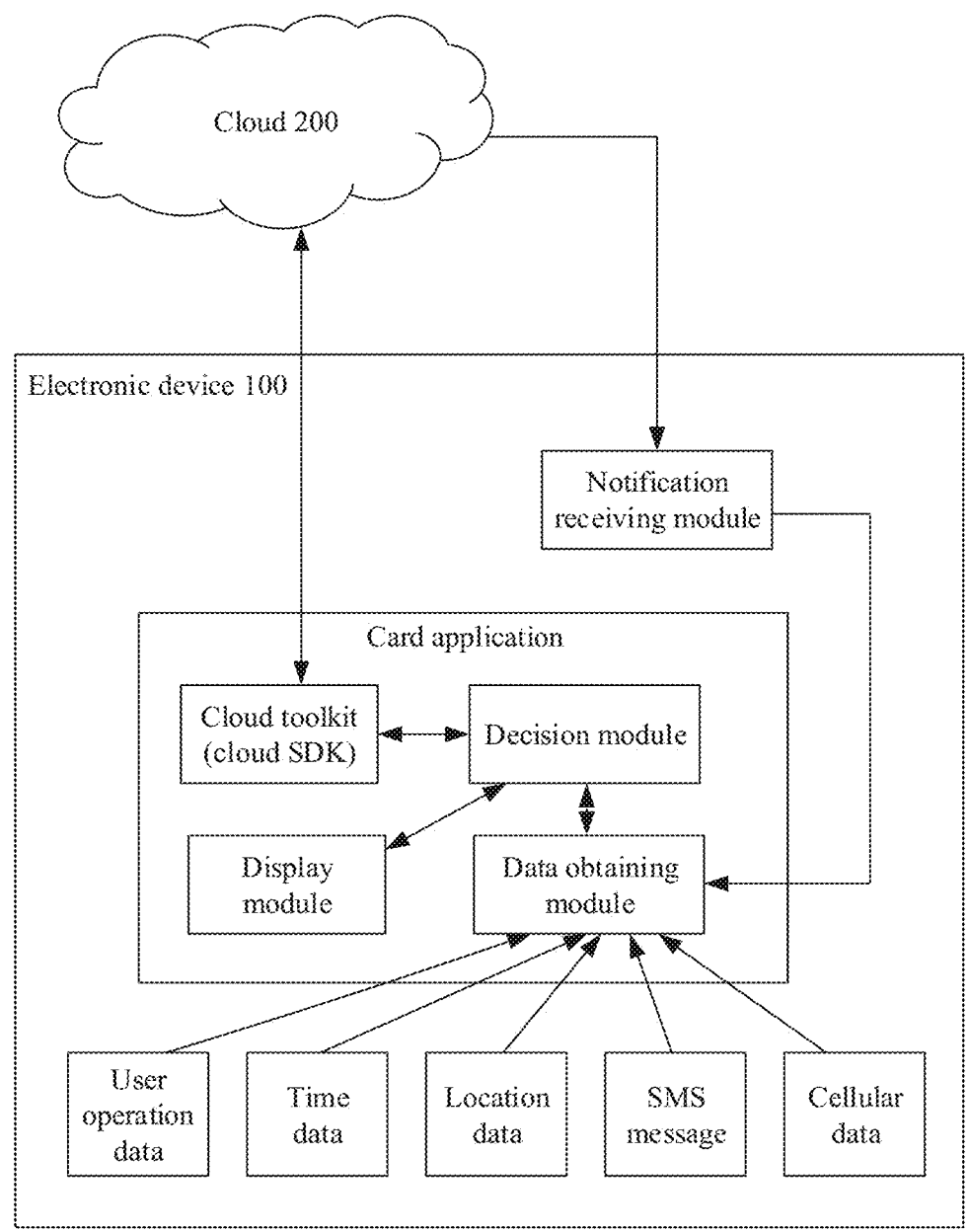
FIG. 4A and FIG. 4B each are a diagram of a system according to an embodiment of this application.

With reference to FIG. 4A, the following describes a system 10 for implementing a dynamic card display method according to an embodiment of this application.

As shown in FIG. 4A, the system 10 may include an electronic device 100 and a cloud 200. In this embodiment of this application, the electronic device 100 is a mobile phone.

The cloud 200 stores all data displayed in a card, for example, the basic information and extended information of the flight shown in FIG. 2A to FIG. 2D and FIG. 3A to FIG. 3G (the flight number, the date, the departure place, the departure time, the boarding gate, and the like).

The data stored in the cloud 200 may be sent to the electronic device 100 through a push (push) mechanism. A notification received by the electronic device 100 through the push mechanism may be referred to as a push notification (push notification, push notification). In another implementation, the electronic device 100 may send a query request to the cloud 200, to obtain, from the cloud 200, data that needs to be displayed in the card.

The cloud 200 includes two interfaces (Application Programming Interface, API): a push (push) interface and a response interface. The cloud 200 may invoke the push interface to send the push notification to the electronic device 100. In response to a data obtaining request of the electronic device 100, the cloud 200 may invoke the response interface to send data to the electronic device 100.

The electronic device 100 includes a card application and a notification receiving module. The card application is a system-level application installed on the electronic device 100. The application includes a data obtaining module, a cloud toolkit (cloud SDK), a decision module, and a display module.

The data obtaining module may be configured to obtain status data of the electronic device 100. The status data includes user operation data, time data, location data, an SMS message, and a cellular signal.

The user operation data is data generated by an operation on a screen of the mobile phone, for example, data generated by a tap operation and data generated by an active operation. When detecting that user operation data is generated, the electronic device 100 may determine that the user performs a user operation on the screen of the mobile phone. In the process of detecting whether there is a user operation performed on the card 211 in FIG. 2A, the electronic device 100 may determine, by detecting whether user operation data is generated, whether there is a user operation performed on the card 211.

The time data refers to a current time obtained by the electronic device 100. The electronic device 100 may obtain the current time by reading a system time. In another implementation, the current time may alternatively be obtained through network time synchronization, that is, the current time is obtained through a network. In the flight card shown in FIG. 3A to FIG. 3G, the electronic device 100 may determine, by using the time data, whether the check-in time arrives and whether a takeoff time approaches.

The location data is data that is obtained by the electronic device 100 and that indicates a geographical location of the device. The electronic device 100 may obtain the location data by using a global positioning system (Global Positioning System, GPS), a wireless fidelity (Wireless Fidelity, Wi-Fi) network connected to the electronic device 100, a cellular signal used by the electronic device 100, or the like. A method for obtaining the location data is not limited in this embodiment of this application. In the flight card shown in FIG. 3A to FIG. 3G, the electronic device 100 may determine, by using the location data, whether the user arrives at the departure airport, a destination airport, or the like.

The SMS message is a short message (short message) received by the electronic device 100. The electronic device 100 may detect whether the electronic device 100 receives a new SMS message. If a newly received SMS message is detected, the electronic device 100 may identify a source of the SMS message. If the SMS message belongs to a specific source, the electronic device 100 may read content of the SMS message. For example, the electronic device 100 may obtain the flight trip of the user based on a ticket delivery SMS message. Specifically, a method for obtaining a flight of a user based on a ticket delivery SMS message is described in detail in a subsequent embodiment, and is not described herein.

The electronic device 100 may further detect whether the device uses a cellular network. The electronic device 100 may detect, by detecting cellular data (cellular data), whether the device uses the cellular network. The electronic device 100 may determine, by using the cellular data, whether the user is on board and whether the user arrives at a destination. Specifically, if it is determined that no cellular data is generated in a time period, the electronic device 100 may determine that the user is on board. The time period is a preset time period. After it is determined that the user is on board, if it is detected that cellular data is generated, the electronic device 100 may determine that the user has arrived at the destination airport.

Certainly, the foregoing method for determining, by using cellular data, a situation in which a user is located is not perfect. The electronic device 100 further obtains time data, location data, and the like in the process of detecting whether the user is on board and in the process of detecting whether the user arrives at the destination.

After the data obtaining module obtains the foregoing status information, the decision module may determine, based on the foregoing status information, a situation in which the user is located. Then, the decision module may indicate, based on an identified situation, the display module to update the content displayed in the card.

For example, in the dynamic card display process shown in FIG. 2A to FIG. 2D, the data obtaining module may detect whether user operation data is generated, that is, detect whether there is a user operation performed on the card 211. When it is detected, within a preset time period, that user operation data is generated, the decision module may respond to the foregoing user operation. Specifically, the decision module may indicate the cloud SDK to obtain data corresponding to the foregoing user operation, and then indicate the display module to display the data obtained by the cloud SDK. When it is not detected, within a preset time period, that user operation data is generated, the decision module may adjust, according to a preset rule, the left and right partitions of the card and information displayed in the partitions.

For example, when a user operation performed on the region B1 in the user interface 23 is detected, in response to the operation, the cloud SDK may obtain extended information (a boarding gate and a seat number) of the second trip from the cloud 200, and the display module may adjust the region B1 to the region B2 in the user interface 24, and display the basic information and the extended information of the second trip in the region B2.

When a user operation performed on the card 211 is not detected, the data obtaining module does not detect user operation data. In this case, the decision module may indicate the cloud SDK and the display module to obtain and display flight data according to a preset rule. The preset rule herein is the rule shown in FIG. 2B to FIG. 2D. For details, refer to the descriptions in FIG. 2B to FIG. 2D. Details are not described herein again.

In the dynamic display process shown in FIG. 3A to FIG. 3G, the data obtaining module may determine, based on the time data, the location data, the SMS message, and the cellular data of the mobile phone, a situation in which the user is located, for example, whether the user checks in, whether the user arrives at the departure airport, or whether the user arrives at the destination airport. Then, the decision module may indicate, based on the situation in which the user is located, the cloud SDK and the display module to update the content displayed in the region B.

A detailed procedure of state switching of the decision module in a dynamic card display process is described in detail in a subsequent embodiment, and is not described herein.

The cloud SDK is a toolkit that is provided by the cloud 200 for the electronic device 100 and that is used to access the cloud 200, and includes a plurality of data read/write interfaces. The electronic device 100 may request, from the cloud 200 by using a read interface provided by the cloud SDK, data required in a card display process, for example, basic information and extended information of a flight displayed in the card. The electronic device 100 may write changed data into the cloud 200 by using a write interface provided by the cloud SDK. For example, after check-in is completed, the electronic device 100 may write a seat number into the cloud 200 by using the write interface provided by the cloud SDK.

Data obtained by the cloud SDK from the cloud 200 may be sent to the display module. The display module may display the data on a screen of the electronic device 100.

The electronic device 100 further includes the notification receiving module. The notification receiving module may be configured to receive a notification actively sent by the cloud 200 to the electronic device 100. In the method described in the foregoing embodiment, the electronic device 100 may obtain the flight information of the user by detecting the ticket delivery SMS message. In this embodiment, the electronic device 100 may further receive a push notification (push notification, push notification) from the cloud 200 by using the notification receiving module, to generate a flight card. The push notification may include the flight information of the user.

Specifically, after the user purchases an air ticket by using a third-party application, the cloud 200 may generate a flight record of the user. The record includes a passenger name, a passenger identity card number, a phone number, an order time, a date (date of flight departure), a departure place, a departure time, a destination, an arrival time, a flight number, and the like.

The cloud 200 may send some or all information in the record to the electronic device 100 in a form of a notification. After receiving the notification, the electronic device 100 may display trip information of the user in a form of the card 211.

In other words, the electronic device 100 obtains data and a service from the cloud 200 in two manners: One manner is that the electronic device 100 sends a data or service obtaining request to the cloud 200 through the cloud SDK. The other manner is that the cloud 200 actively sends a notification to the electronic device 100.

In the former manner, the electronic device 100 may obtain, from the cloud 200 based on a requirement of the electronic device 100, data or a service required by the electronic device 100. For example, when the mobile phone determines that the seat number of the user should be displayed in the card, the mobile phone may send a request for obtaining the seat number of the user to the cloud 200. In response to the request sent by the mobile phone, the cloud 200 may send the seat number of the user to the mobile phone. Then, the mobile phone may display the seat number of the user.

In the latter manner, the electronic device 100 may learn of a change of a trip of the user in a timely manner based on a notification pushed by the cloud 200. For example, after the user changes a flight, the cloud 200 may update a trip plan of the user recorded in the cloud 200, that is, replace information such as a date and a flight number of an original trip with information such as a changed date and a changed flight number. Then, the cloud 200 may send updated trip information to the mobile phone. In this way, the mobile phone can update, in a timely manner, information displayed in the card, so that the user can be prompted in a more timely manner, to prevent the user from missing a trip.

Usually, the cloud 200 is provided by a third party. For example, in a process in which the electronic device 100 displays a flight card, information in the flight card usually needs to be provided by an airline or a third party (such as Umetrip) that assembles flight information of many airlines. In consideration of permission and management on the electronic device 100, a manner in which the electronic device 100 independently obtains data or a service from a cloud provided by a third party is not preferred.

Figure 4B:
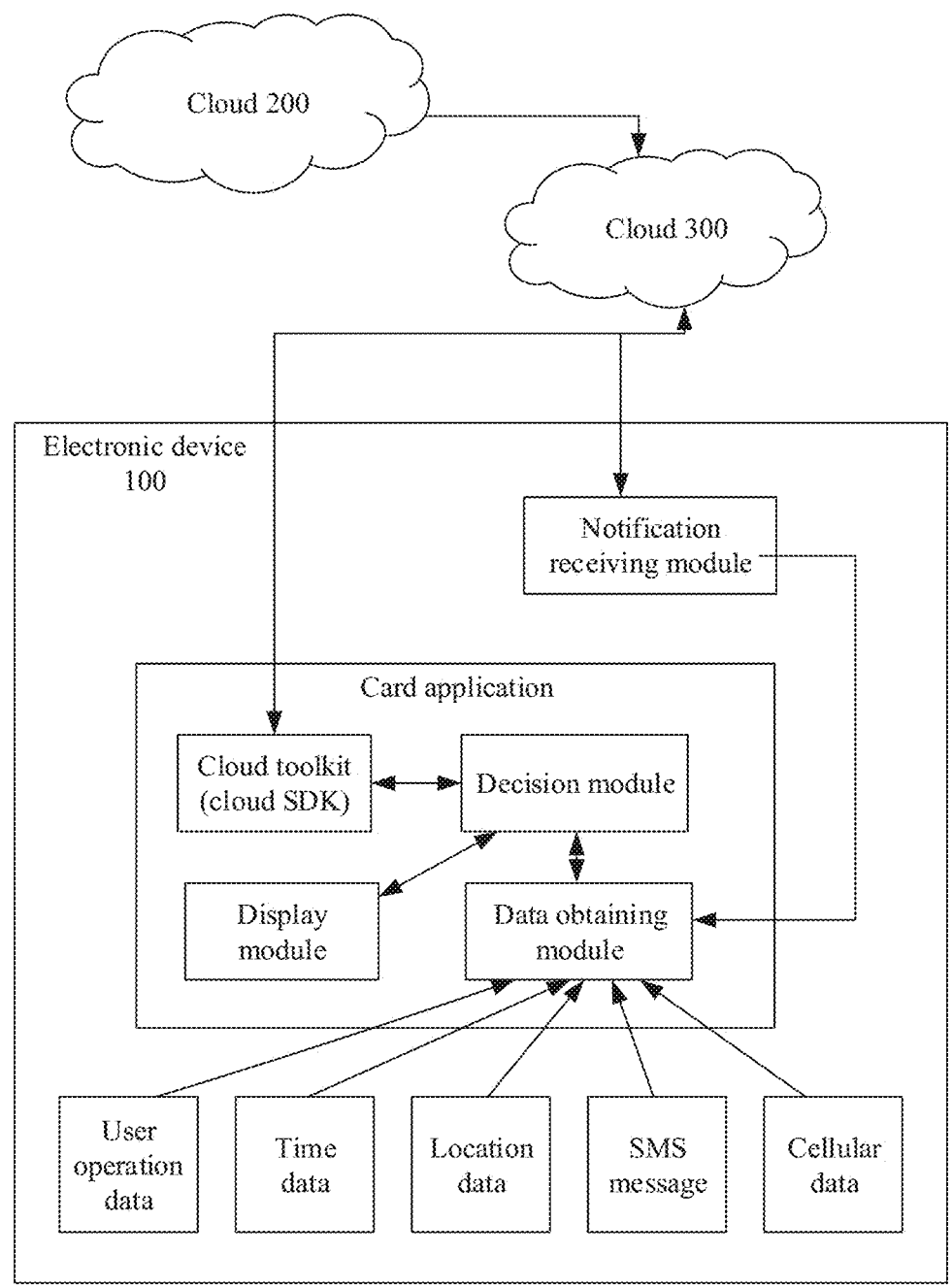

Therefore, in another implementation, the system 10 may alternatively be designed into that shown in FIG. 4B. As shown in FIG. 4B, the system 10 may further include a cloud 300. The cloud 300 is a data set constructed for the electronic device 100, that is, the cloud 300 stores all data required by the electronic device 100. It may be understood that the data stored in the cloud 300 is obtained from the cloud 200.

The cloud 200 may detect a change of stored data, and then the cloud 200 may send changed data to the cloud 300 in a push notification manner. Further, the cloud 300 may send the changed data to the electronic device 100. For example, in a ticket changing process, the cloud 200 may detect a change in data such as a flight number and a departure time of the user. Then, the cloud 200 may send changed data to the cloud 300 in a push notification manner. After receiving the changed data, the cloud 300 may modify data such as a flight number and a departure time that are stored in the cloud 300.

Then, the cloud 300 may send the changed data to the electronic device 100. In this way, the electronic device 100 may display information such as a changed flight number and a changed departure time.

Correspondingly, in a process in which the electronic device 100 requests the flight information of the user by using the cloud SDK, the cloud SDK may obtain the flight information of the user from the cloud 200. Certainly, in another embodiment, the cloud SDK may alternatively obtain the flight information of the user from the cloud 300. This is not limited in this embodiment of this application.

In this way, the electronic device 100 can obtain data from the cloud 300 at any time, to avoid direct contact with a third-party cloud (the cloud 200). In addition, the cloud 300 may further perform centralized management on data of the electronic device 100.

Figure 5:
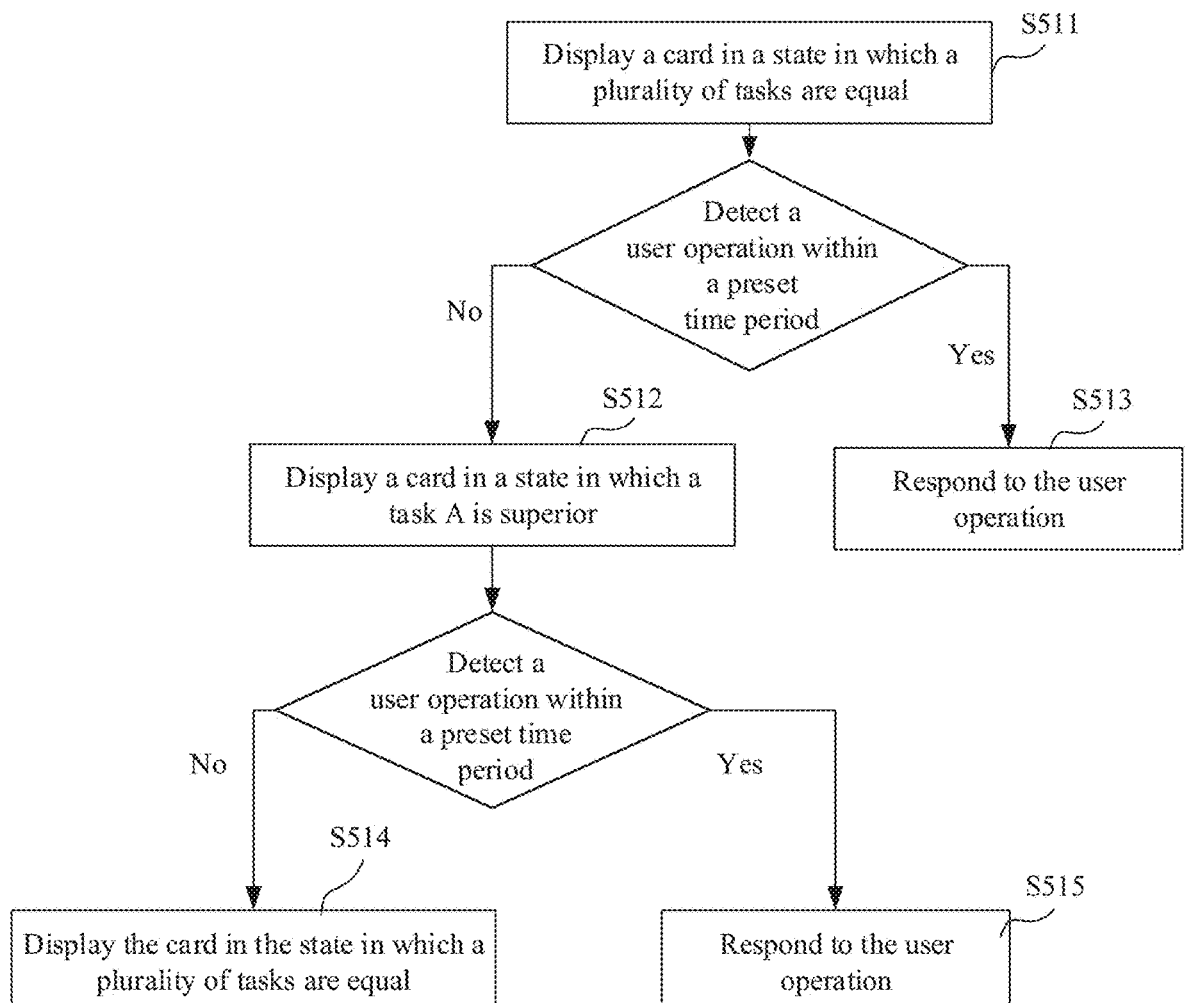
FIG. 5 is a flowchart in which an electronic device changes content of a card according to an embodiment of this application.

With reference to a flowchart shown in FIG. 5, the following describes the dynamic card display method shown in FIG. 2A to FIG. 2D.

After obtaining a plurality of trips of a user, the electronic device 100 may determine two trips from the plurality of trips. The two trips are trips displayed in left and right partitions of a flight card.

Specifically, the electronic device 100 may rank the plurality of trips in a time sequence based on dates and departure times of the plurality of trips. An earlier trip is prior to a later trip. Then, the electronic device 100 may determine two earliest trips as trips (a first trip and a second trip) to be displayed in the card.

S511: The electronic device 100 displays a card in a state in which a plurality of tasks are equal.

After determining the to-be-displayed trips, the electronic device 100 may first display the flight card in the state in which a plurality of tasks are equal. The card may be divided into a left partition and a right partition, which are denoted as a region A (left partition) and a region B (right partition).

The state in which a plurality of tasks are equal means that the region A and the region B each occupy half of an entire region of the card, and information amounts of flight information displayed in the region A and the region B are equal. When the card is in the state in which a plurality of tasks are equal, a user can obtain basic information of two flights at the same time.

The region A may display basic information of the first trip, and the region B may display basic information of the second trip. The basic information includes but is not limited to a flight number, a date, a departure time, a departure place, an arrival time, and a destination.

Referring to the card 211 shown in FIG. 2B, a flight displayed in the region A is: CA1314, January 9, flight from Shenzhen Bao'an to Beijing Capital, departure time 8:00, and arrival time 11:20. A flight displayed in the region B is: CA1435, January 9, flight from Beijing Capital to Shanghai Hongqiao, departure time 17:00, and arrival time 19:20.

S512: If a user operation performed on the card is not detected within a preset time period, the electronic device 100 displays a card in a state in which a task A is superior.

After displaying the card in the state in which a plurality of tasks are equal, the electronic device 100 may detect whether the user performs a user operation on the flight card (card 211). First, the electronic device 100 may set a preset time period. Then, the electronic device 100 may detect, within the preset time period, whether there is a user operation performed on the card. The preset time period is, for example, 2 seconds.

If the electronic device 100 does not detect, within the preset time period, a user operation performed on the card (the card in the state in which a plurality of tasks are equal), the electronic device 100 may display the card in the state in which the task A is superior.

The state in which the task A is superior means that the region A occupies a larger area of the entire card, and the region B occupies a smaller area of the entire card, that is, an amount of information displayed in the region A is greater than an amount of information displayed in the region B. When the card is in the state in which the task A is superior, the user can obtain more information about the first trip.

Refer to the user interface shown in FIG. 2C. In addition to the basic information of the flight (such as the flight number described above), the information displayed in the region A further includes extended information: a seat number ("45C"), a boarding gate ("K52"), and a button (button 231) for viewing a boarding pass.

In another embodiment, in a process of displaying the extended information, the mobile phone may further determine, based on a time and a location, a situation in which the user is located, and then adjust specific content of the extended information according to the situation. For example, when it is detected that check-in of the flight of the user has started, the extended information displayed in the region A shown in FIG. 2C may include a check-in time and a check-in shortcut (a check-in button). When it is detected that the user arrives at a departure airport, and the user has not checked in, the extended information displayed in the region A shown in FIG. 2C may include a check-in counter. Therefore, in a specific implementation process, not limited to the foregoing enumerated information such as the seat number and the boarding gate, the extended information may further include other information. This is not limited in this embodiment of this application.

In this way, the user can obtain more information about the first trip from the region A. and the user does not need to perform a specific operation.

When the information displayed in the region A increases, the information displayed in the region B decreases. In this case, the information displayed in the region B may include only a departure place ("Beijing") and a destination ("Shanghai") of the second flight.

S513: If a user operation performed on the card is detected within a preset time period, the electronic device 100 responds to the user operation.

If the electronic device 100 detects, within the preset time period, a user operation performed on the card, the electronic device 100 may respond to the user operation and perform a task that matches the user operation. The user operation herein may include a user operation performed on the region A and a user operation performed on the region B.

Specifically, if the user operation performed on the card is specifically the user operation performed on the region A, in response to the user operation, the electronic device 100 may display the card in the state in which the task A is superior. If the user operation performed on the card is specifically the user operation performed on the region B, in response to the user operation, the electronic device 100 may display a card in a state in which a task B is superior.

S514: If a user operation performed on the card is not detected within a preset time period, the electronic device 100 displays the card in the state in which a plurality of tasks are equal.

After performing the operation in S512, the electronic device 100 may continue to detect whether there is a user operation performed on the flight card (card 211). Herein, the electronic device 100 may also set a preset time period. Then, the electronic device 100 may detect, within the preset time period, whether there is a user operation performed on the card. In particular, the preset time period herein may be the same as or different from the preset time period in S512. This is not limited in this embodiment of this application.

If the electronic device 100 does not detect, within the preset time period, a user operation performed on the card (the card in the state in which the task A is superior), the electronic device 100 may display the card in the state in which a plurality of tasks are equal.

S515: If a user operation performed on the card is detected within a preset time period, the electronic device 100 responds to the user operation.

The same as that in S513, if the electronic device 100 detects, within the preset time period, a user operation performed on the card, the electronic device 100 may respond to the user operation and perform a task that matches the user operation.

Specifically, if the user operation performed on the card is specifically the user operation performed on the region A, in response to the user operation, the electronic device 100 may display the card in the state in which the task A is superior. If the user operation performed on the card is specifically the user operation performed on the region B, in response to the user operation, the electronic device 100 may display a card in a state in which a task B is superior.

With reference to the flowcharts shown in FIG. 6A to FIG. 6E, the following describes the dynamic card display method shown in FIG. 3A to FIG. 3H.

Figure 6A:
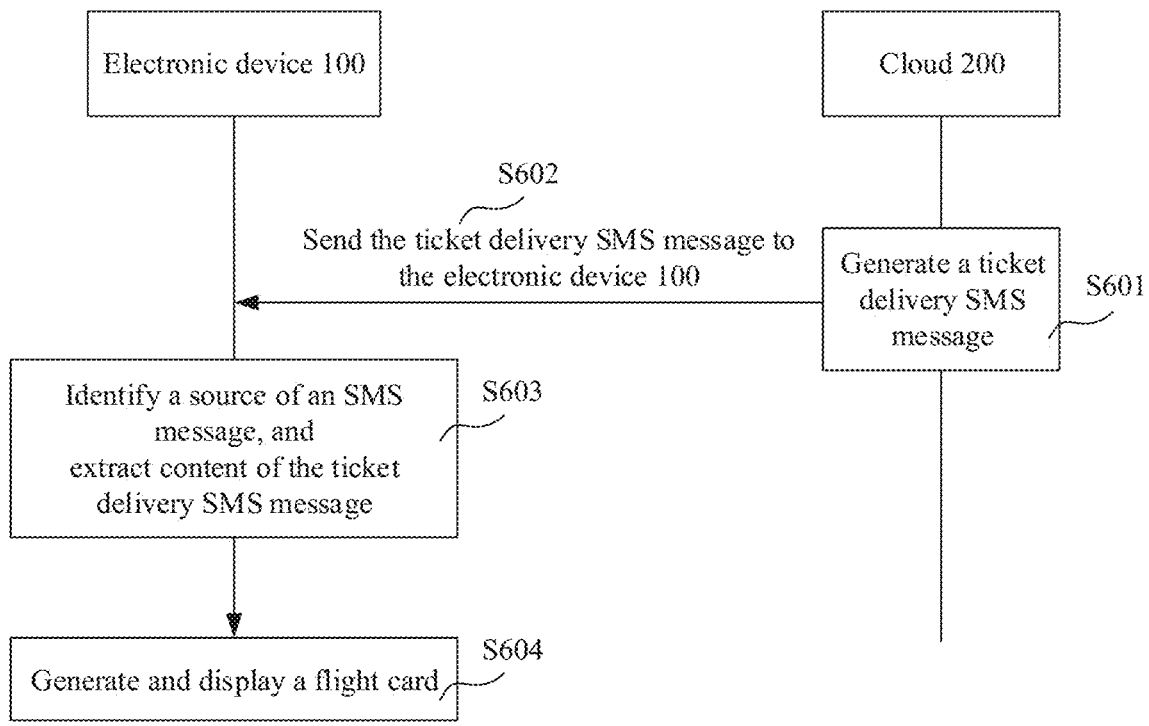
FIG. 6A to FIG. 6E each are a flowchart in which an electronic device changes content of a card according to an embodiment of this application.

First, FIG. 6A is a flowchart in which the electronic device 100 displays a flight card in a ticket booking scenario.

S601: The cloud 200 generates a ticket delivery SMS message.

A user may purchase an air ticket through an airline's official website or a third-party application such as Fliggy or Ctrip. After the purchase operation is completed, the cloud 200 may generate a flight record of the user. The record includes a passenger name, a passenger identity card number, a phone number, an order time, a date (date of flight departure), a departure place, a departure time, a destination, an arrival time, a flight number, and the like.

Then, the electronic device 100 may receive the ticket delivery SMS message sent by the cloud 200. Specifically, the cloud 200 may obtain the phone number of the user from the foregoing flight record. The cloud 200 may set the phone number to a receiver of the SMS message.

In addition, the cloud 200 may extract, from the flight record, data required for the ticket delivery SMS message. Usually, the data required for the ticket delivery SMS message includes the passenger name, the flight number, the departure place, the departure time, the destination, the arrival time, and the like. Certainly, the ticket delivery SMS message may further include more information. This is not limited herein.

S602: The cloud 200 sends the ticket delivery SMS message to the electronic device 100.

Based on the foregoing information such as the passenger name, the flight number, the departure place, and the departure time, the cloud 200 may generate the ticket delivery SMS message. Then, the cloud 200 may send the ticket delivery SMS message to an electronic device corresponding to the foregoing phone number. In this embodiment of this application, the user is a user of the electronic device 100, and the phone number of the user corresponds to the electronic device 100.

Therefore, the electronic device 100 can receive the ticket delivery SMS message sent by the cloud 200, that is, the user can receive the ticket delivery SMS message.

S603: The electronic device 100 identifies a source of an SMS message, and extracts content of the ticket delivery SMS message.

A data obtaining module of a card application may perceive the ticket delivery SMS message received by the electronic device 100. Further, the data obtaining module may extract data such as the passenger name, the flight number, the departure place, the departure time, the destination, and the arrival time from the ticket delivery SMS message.

Specifically, the electronic device 100 may determine, based on the source of the SMS message, whether the SMS message is sent by an airline. After determining that the SMS message is sent by the airline, the electronic device 100 may parse content of the SMS message to check whether the SMS message is a ticket delivery SMS message. If the foregoing data such as the passenger name and the flight number cannot be obtained after the SMS message is parsed, the electronic device 100 may determine that the SMS message is not a ticket delivery SMS message. If the foregoing data can be obtained after the SMS message is parsed, the electronic device 100 may determine that the SMS message is a ticket delivery SMS message, and the electronic device 100 may display the data such as the passenger name and the flight number in a flight card.

For example, the electronic device 100 may receive an SMS message from "95583" (Air China). For example, the SMS message is "Dear member: You have booked Air China CA1314 from Shenzhen to Beijing, departing from Shenzhen Bao'an T3 at 8:00 01/09/2021 and arriving at Beijing Capital T3 at 11:20 01/09/2021. Passenger: Lisa. Please bring valid credentials to the airport two hours in advance to avoid missing the flight. Wish you a good trip".

Based on the sender number "95583", the electronic device 100 may determine that the SMS message is an SMS message sent by Air China. Then, the electronic device 100 may parse content of the SMS message. Using the content shown in the SMS message as an example, the electronic device 100 may obtain data such as a flight number ("CA1314"), a departure time ("8:00 01/09/2021"), a departure place ("Shenzhen Bao'an T3"), an arrival time ("11:20 01/09/2021"), and a destination ("Beijing Capital T3").

In addition, the SMS message may be further provided with a label indicating an SMS message type, for example, an express SMS message, an advertisement SMS message, or a ticket delivery SMS message. Therefore, the electronic device 100 may further identify, by using the label, a ticket delivery SMS message sent by an airline. After determining, by using the label, that the SMS message is a ticket delivery SMS message, the electronic device 100 may extract content of the ticket delivery SMS message. For details, refer to the foregoing description. Details are not described herein again.

S604: The electronic device 100 generates and displays a flight card.

After obtaining the foregoing data (the flight number, the departure time, the departure place, and the like) from the ticket delivery SMS message, the electronic device 100 may generate the flight card. The card may include the foregoing data. Then, the electronic device 100 may display the flight card, referring to the card 311 shown in FIG. 3A. In the card shown in FIG. 3A, ticket delivery information displayed in the card includes "CA1314, January 9, Monday, Shenzhen Bao'an T3, 8.00, Beijing Capital T3, 11:20". The card shown in FIG. 3A may be referred to as a flight card in a ticket delivery phase.

In this way, the electronic device 100 may determine, by monitoring an SMS message on the device, whether the user schedules a flight trip. In addition, the electronic device 100 may further extract the flight data of the user by parsing the ticket delivery SMS message, and then generate the flight card. In this way, the user can obtain, at any time by using the flight card, information about the flight booked by the user, to avoid a trip delay.

In another embodiment, the electronic device 100 may alternatively obtain the foregoing data (the flight number, the departure time, the departure place, and the like) by receiving a push notification.

In this implementation, after the user completes purchasing the air ticket, the cloud 200 may generate a push notification. For specific content included in the push notification, refer to the foregoing ticket delivery SMS message. Details are not described herein.

After generating the push notification, the cloud 200 may invoke a push interface to send the push notification to the electronic device 100. The electronic device 100 may receive the notification. Specifically, the electronic device 100 has a notification receiving module. The module may be configured to receive a push notification. Therefore, the module may receive the push notification sent by the cloud 200.

After receiving the push notification sent by the cloud 200, the electronic device 100 may parse the notification, and then obtain the flight information included in the notification. Therefore, the electronic device 100 can extract the flight data of the user from the notification, including the flight number, the departure time, the departure place, and the like.

Specifically, after the notification receiving module receives the push notification, the data obtaining module may obtain the push notification from the notification receiving module. Then, a cloud SDK module may parse the push notification, to obtain the flight data of the user. Further, the electronic device 100 may generate the flight card based on the flight data, and display the card. For the card, refer to the card 311 shown in FIG. 3A.

In the method using the push notification, the electronic device 100 may not identify and extract an SMS message. In this way, the electronic device 100 can more conveniently and timely obtain the flight data of the user.

Figure 6B:
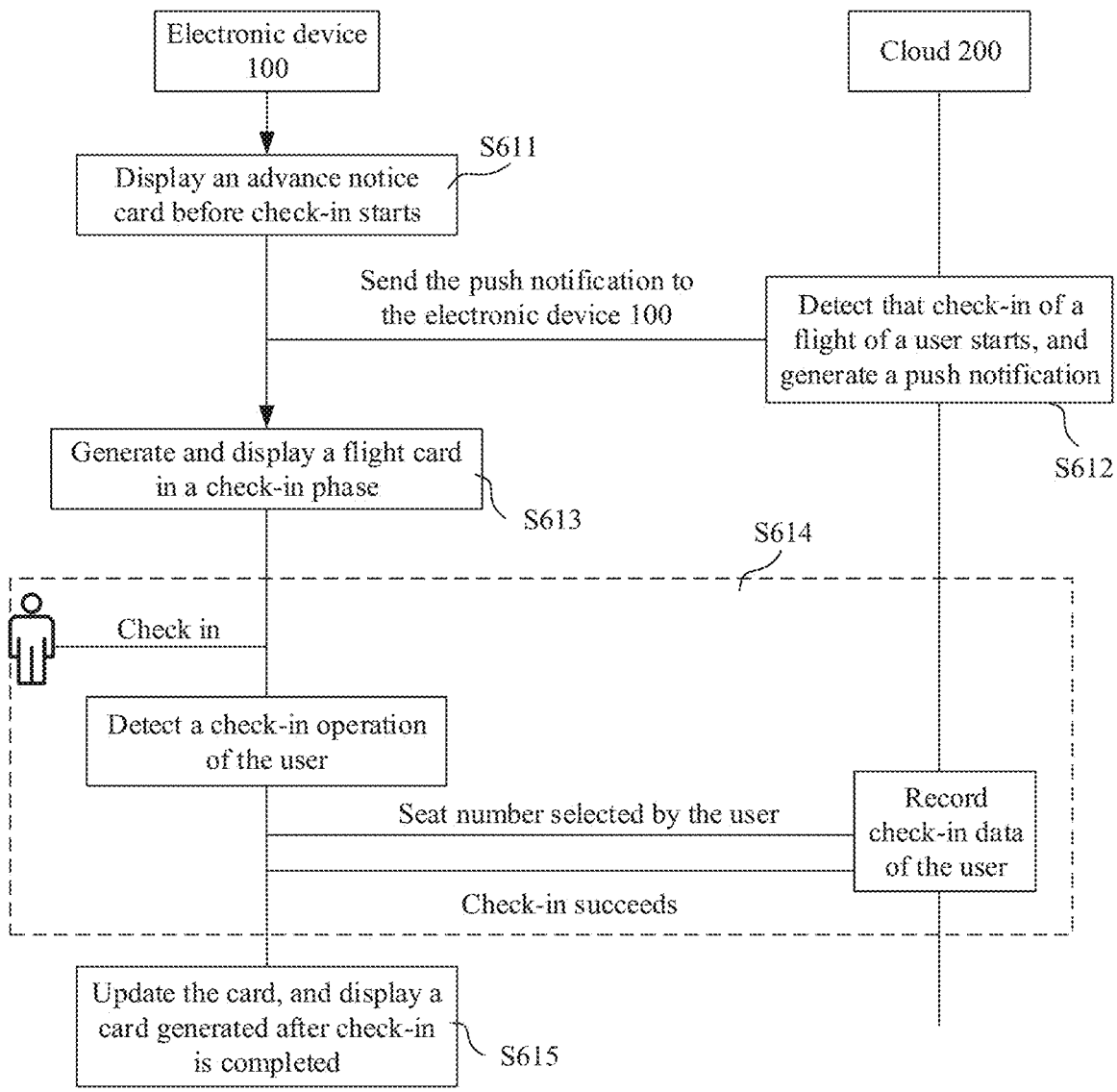

With reference to FIG. 6B, the following describes a flowchart in which the electronic device 100 displays a flight card of a check-in reminder after the user checks in.

S611: The electronic device 100 may display an advance notice card before check-in starts.

After obtaining a trip of the user, the electronic device 100 may determine a check-in time based on a flight number and a departure time in the trip. The airline starts check-in some time before takeoff. Usually, the time is one day, that is, one day before takeoff. Certainly, different airlines may start check-in at different times. Therefore, the electronic device 100 may determine the check-in time of the flight based on the flight number and the departure time.

After determining a check-in start time, the electronic device 100 may determine that a time period before the time is a time period for displaying an advance notice. The advance notice is an advance notice for notifying the user that check-in of the flight is to start. The time period is preset (preset time period), for example, 2 hours before check-in starts.

The electronic device 100 may obtain a current system time. When the current system time is within the preset time period, the electronic device 100 may replace, with the advance notice card, the flight card displayed in the ticket delivery phase. The advance notice card includes an advance check-in notice. The advance check-in notice may notify the user of a expected check-in start time of the flight.

For example, the card 312 shown in FIG. 3B may be referred to as an advance notice card. In this case, the region B may display "Expected check-in start time: 18:00 Today". After seeing the foregoing prompt, the user can know that the user can check in after 18:00 today.

S612: The cloud 200 detects that check-in of the flight of the user starts, and generates a push notification.

The cloud 200 may detect an event when check-in of the flight of the user starts. Specifically, the cloud 200 may obtain a current time. When determining that the current time is consistent with the check-in time of the flight of the user, the cloud 200 determines that check-in of the flight of the user starts. Then, the cloud 200 may generate the push notification. The notification may indicate the electronic device 100 to display a check-in reminder. Further, the cloud 200 may invoke the push interface to send the push notification to the electronic device 100.

S613: The electronic device 100 generates and displays a flight card including a check-in reminder.

The notification receiving module of the electronic device 100 may receive the notification. Further, the notification may be sent to the data obtaining module. The data obtaining module may report the notification to a decision module. In this case, the decision module can learn that check-in of the flight of the user starts. Then, the decision module may indicate a display module to display the flight card including the check-in reminder. Then, the display module may display the card on a screen of the electronic device 100.

The check-in reminder is, for example, "Check-in has started". As shown in FIG. 3C, the region B of the card 312 may display "Check-in has started". After seeing the foregoing prompt information, the user can know that the user can check in.

In addition, the flight card including the check-in reminder may further include a check-in button. The check-in button can be used to check in. Specifically, when detecting a user operation performed on the check-in button, the electronic device 100 may display a user interface of check-in and seat selection. As shown in FIG. 3C, the region B of the card 312 may further include the check-in button 231. When detecting a user operation performed on the check-in button 231, the electronic device 100 may display a user interface for checking in.

In another implementation, whether check-in of the flight of the user starts may alternatively be determined by the electronic device 100. Specifically, the electronic device 100 may obtain time data. Herein, the time data includes the check-in start time of the flight and the current system time. When the current system time obtained by the electronic device 100 is the check-in start time, or the current system time is later than the check-in start time, the electronic device 100 may determine that check-in of the flight of the user starts. In this case, the electronic device 100 may generate and display the flight card including the check-in reminder, referring to the card 312 shown in FIG. 3C.

S614: The user checks in by using the electronic device 100.

After displaying the flight card including the check-in reminder, the electronic device 100 may detect whether there is a user operation performed on the check-in button. After detecting a user operation performed on the check-in button, in response to the operation, the electronic device 100 may display the user interface for checking in.

Specifically, after detecting the user operation performed on the check-in button, the electronic device 100 may send a check-in request to the cloud 200 by using a read interface provided by the cloud SDK. In response to the request, the cloud 200 may send seat distribution data of the flight to the electronic device 100. The seat distribution data includes a spatial location of each seat, and further includes information indicating whether the seat can be selected.

After receiving the seat distribution data, the electronic device 100 may display the user interface for checking in. The user interface displays all seats of the flight. Some seats cannot be selected (selected by others) and some seats can be selected (not selected by others). The user may select a seat from the seats displayed in the interface.

After the user confirms the seat selected by the user, the electronic device 100 may send a seat number selected by the user to the cloud 200 by using a write interface provided by the cloud SDK.

After the cloud 200 receives the seat number sent by the electronic device 100, the cloud 200 may store the seat number in the flight record of the user. Certainly, before this, the cloud 200 further needs to detect whether the seat number of the user meets a requirement. For example, when the seat selected by the user is available, the seat number of the user meets the requirement. When the seat selected by the user is not available, the seat number of the user does not meet the requirement, that is, a conflict exists.

After the cloud 200 determines that the seat number of the user meets the requirement, the cloud 200 may send an acknowledgment signal to the electronic device 100, that is, check-in succeeds. In this case, the seat selected by the user is locked as a seat of the user.

S615: The electronic device 100 updates content in the card, and displays a flight card generated after check-in is completed.

After receiving the acknowledgment signal that is sent by the cloud 200 and that indicates that check-in succeeds, the electronic device 100 may display the flight card generated after check-in is completed. In addition to the basic information (the date, the departure time, the departure place, the arrival time, and the destination) of the flight, the flight card generated after check-in is completed may further include the seat number of the user.

Specifically, after the acknowledgment signal is received, the decision module of the card application may determine that the user has completed the check-in operation. In this case, the decision module may indicate the display module to display the flight card generated after check-in is completed. Therefore, the display module may replace, with a check-in completion prompt, a check-in start prompt displayed in the region B.

Referring to FIG. 3D, the left region (region A) of the card 312 may display the basic information of the flight. The right region (region B) of the card 312 may display a prompt indicating that the user has checked in and the seat number selected by the user during check-in. The prompt message is, for example, "Check-in and seat selection completed". The seat number is, for example, "23D".

Figure 6C:
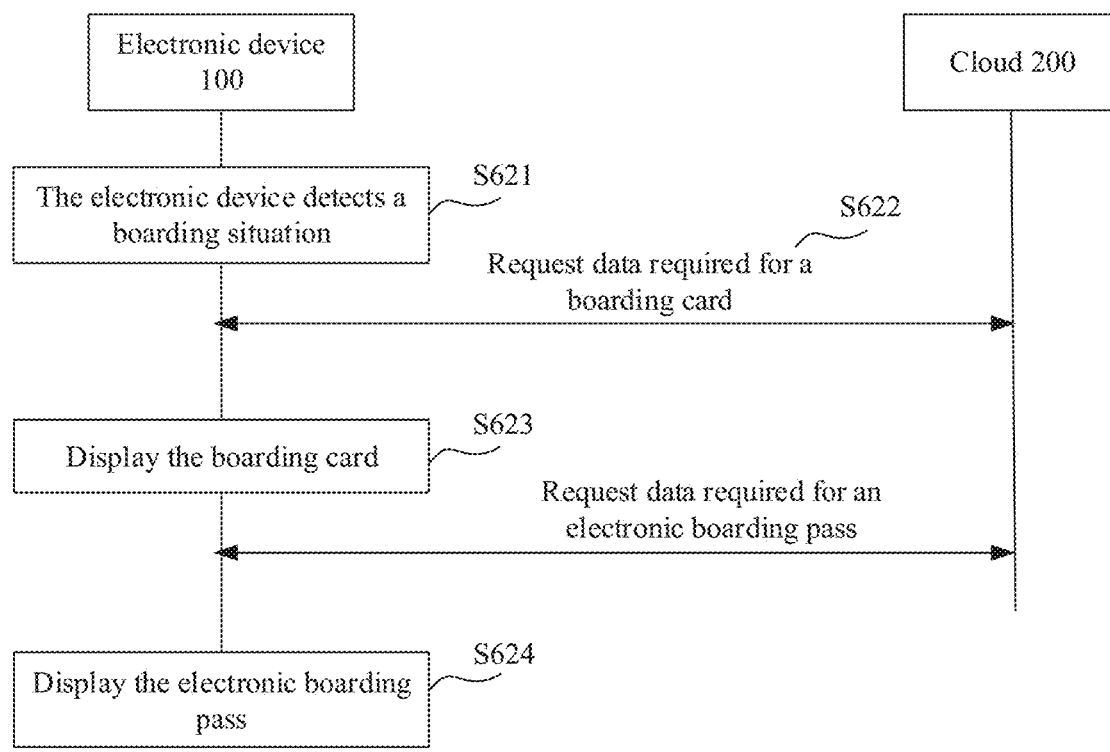

FIG. 6C is a flowchart in which the electronic device 100 changes a flight card in a boarding phase.

S621: The electronic device 100 detects that the user is in a boarding situation.

After determining that the user has completed the check-in operation, the electronic device 100 may detect that the user is in the boarding situation. Specifically, the electronic device 100 may determine, based on status information, whether the user is in the boarding situation. The status information herein includes time data and location data.

The time data includes a departure time and a current system time. The current system time may be obtained by obtaining a system time of the electronic device 100. Optionally, the electronic device 100 may obtain the current system time through network time synchronization. The location data may be obtained by using a GPS, Wi-Fi connected to the electronic device 100, a cellular signal used by the electronic device 100, or the like. This is not limited in this embodiment of this application.

Referring to FIG. 4A, the data obtaining module may periodically obtain a current system time and a current location (time data and location data) that are of the mobile phone. Then, the decision module may determine, based on the current system time and the current location that are obtained by the data obtaining module, whether the user is in the boarding situation.

Specifically, the electronic device 100 may set a preset time period. If the current system time is within the preset time period before the departure time, the electronic device 100 may determine that the current system time is close to the departure time. For example, the departure time of the flight of the user is "8:00", and the electronic device 100 may set 20 minutes before the departure time, that is, "7:40 to 8:00", as a time period close to the departure time. If the current system time is within "7:40 to 8:00", the electronic device 100 may determine that the flight of the user is to take off.

In addition, the electronic device 100 may determine, based on the current location, whether the user has arrived at the departure airport. When the current location indicates that the electronic device 100 is within a geographical range of the departure airport, that is, the user is within the geographical range of the departure airport, the electronic device 100 may determine that the user has arrived at the departure airport.

When the current system time is within a range close to the departure time, and the user has arrived at the departure airport, the electronic device 100 may determine that the user is in the boarding situation and is to go aboard.

S622: The electronic device 100 obtains data required for a boarding card from the cloud 200.

The electronic device 100 may display a flight card (boarding card) of a boarding phase when determining that the user is in the boarding phase. In addition to the basic information of the flight, content displayed in the boarding card further includes extended information: a boarding gate and a seat number, referring to FIG. 3G.

Specifically, after determining that the user is in the boarding phase, the electronic device 100 may request the basic information and the extended information of the flight from the cloud 200 by using the cloud SDK. In response to the request, the cloud 200 may send the basic information and the extended information of the flight to the electronic device 100.

S623: The electronic device 100 generates and displays the boarding card.

After the basic information and the extended information of the flight that are sent by the cloud 200 are received, the cloud SDK may generate the boarding card. Then, the display module may display the boarding card on the screen of the electronic device 100, referring to the user interface shown in FIG. 3G.

In this case, when seeing the flight card, the user can quickly learn of information such as the boarding gate and the seat number, so that the user can quickly complete boarding, and it can avoid finding a wrong boarding gate or a wrong seat.

S624: The electronic device 100 displays an electronic boarding pass.

Optionally, the boarding card may further include a boarding pass button, referring to the button 361 shown in FIG. 3G. When a user operation performed on the button is detected, in response to the operation, the electronic device 100 may display a user interface including the electronic boarding pass.

Specifically, when the user operation performed on the button is detected, in response to the operation, the electronic device 100 may send, to the cloud 200 through the read interface provided by the cloud SDK, a request for obtaining data required for the electronic boarding pass. The data required for the electronic boarding pass includes a passenger name, a flight number, a date, a destination, a cabin, a seat number, a boarding gate, and a health code.

In response to the request, the cloud 200 may extract the data from the flight record of the user. Then, the cloud 200 may send the data to the electronic device 100.

The cloud SDK of the electronic device 100 may receive the data. Then, the decision module may indicate the display module to display the data, that is, display the electronic boarding pass.

If the user performs an operation such as ticket changing or ticket returning, the flight record of the user stored in the cloud 200 changes. In this case, the content displayed in the flight card of the electronic device 100 also needs to change accordingly to avoid misleading the user.

Figure 6D:
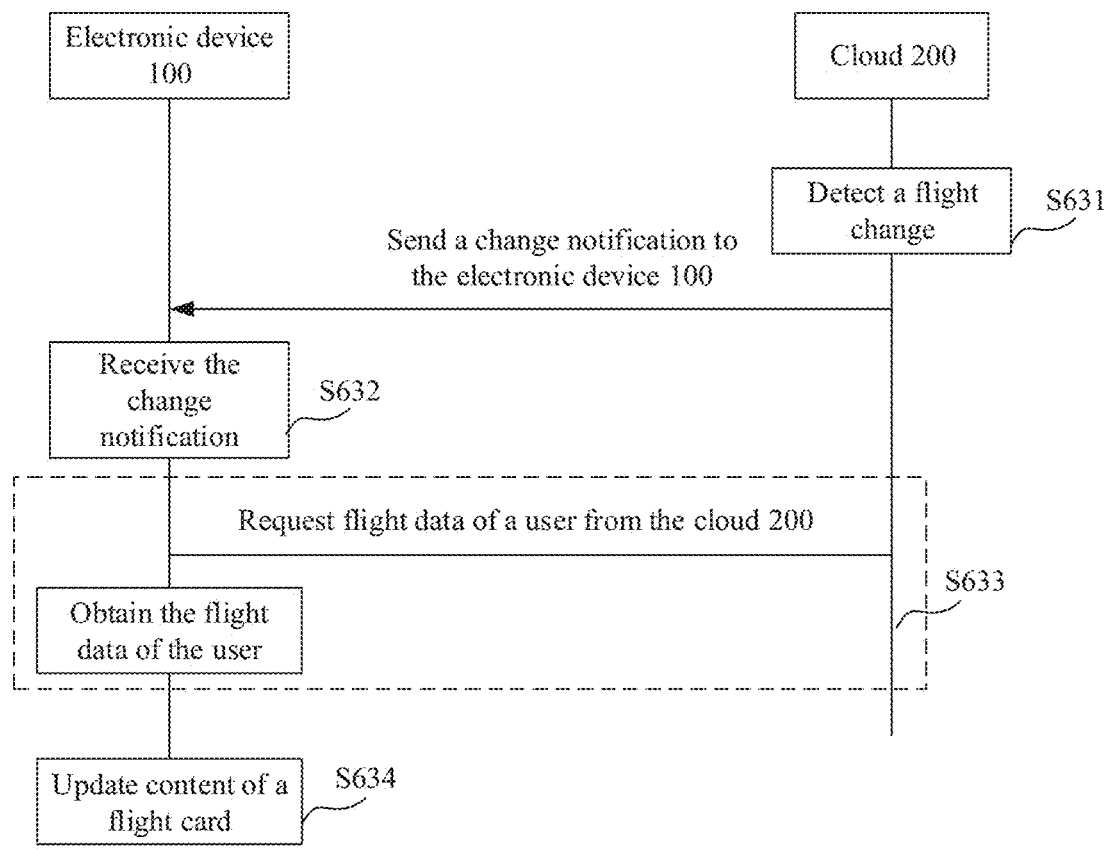

FIG. 6D is a flowchart in which the electronic device 100 updates content of a flight card based on an operation such as a flight change.

S631: The cloud 200 detects a flight change transaction.

When a schedule of the user changes, the user may perform a procedure such as returning the ticket or changing the ticket, to change the schedule. When the user returns the ticket or changes the ticket, in response to the operation, the flight record of the user stored in the cloud 200 changes accordingly.

Specifically, when the user returns the ticket, in response to the operation, the cloud 200 may mark the flight record of the user as invalid. When the user changes the ticket, in response to the operation, the cloud 200 may change information such as the flight number and the departure time stored in the flight record to information about a changed flight.

For example, the flight originally booked by the user is "departing from Shenzhen Bao'an T3 at 8:00 in the morning and arriving at Beijing Capital T3 at 11:20 in the morning". In this case, a departure time of the user recorded in the cloud 200 is "8:00" and an arrival time is "11:20". The user may change the flight to "departing from Shenzhen Bao'an T3 at 11:00 in the morning and arriving at Beijing Capital T3 at 13:20 in the afternoon". In this case, the departure time of the user recorded in the cloud 200 may be changed to "11:00" and the arrival time may be changed to "13:20". In this case, the cloud 200 may detect the change.

S632: The electronic device 100 receives a change notification.

After the flight record of the user stored in the cloud 200 changes, the cloud 200 may send the change notification to the electronic device 100.

First, the cloud 200 may generate a push notification. Then, the cloud 200 may invoke the push interface to send the push notification (change notification) to the electronic device 100. The push notification may include changed flight data. In some embodiments, the push notification may alternatively indicate the electronic device 100 to request the flight data of the user from the cloud 200.

Then, the notification receiving module of the electronic device 100 may receive the push notification.

S633: The electronic device 100 obtains flight data from the cloud 200 based on the change notification.

After receiving the push notification, the electronic device 100 may parse the notification. Through parsing, the electronic device 100 may obtain the changed flight data. Then, the display module may display the changed flight data in a flight card.

Optionally, through parsing, the electronic device 100 may obtain a command that indicates the electronic device 100 to request flight data from the cloud 200. In response to the command, the electronic device 100 may send a flight data obtaining request to the cloud 200 by using the cloud SDK. The flight data may include a flight number, a departure time, a departure place, an arrival time, a destination, and the like. In response to the request, the cloud 200 may send the data to the electronic device 100. Then, the cloud SDK may generate a new flight card. Further, the display module displays the new flight card.

For example, after the user changes the flight to "departing from Shenzhen Bao'an T3 at 11:00 in the morning and arriving at Beijing Capital T3 at 13:20 in the afternoon", the departure time obtained by the electronic device 100 may be changed to "11:00" and the arrival time may be changed to "13:20". Therefore, the departure time displayed in the card may be changed to "11:00", and the arrival time displayed in the card may be changed to "13:20".

S634: The electronic device 100 updates content displayed in the flight card.

After receiving the foregoing changed data, the electronic device 100 may generate the new flight card. Further, the electronic device 100) may display the new flight card.

In another embodiment, the push notification sent by the cloud 200 may also include the changed data. In this way, through parsing, the electronic device 100 may directly obtain the changed flight data. Then, the electronic device 100 may generate the new flight card based on the changed flight data, and then the electronic device 100 may display the new flight card.

Figure 6E:
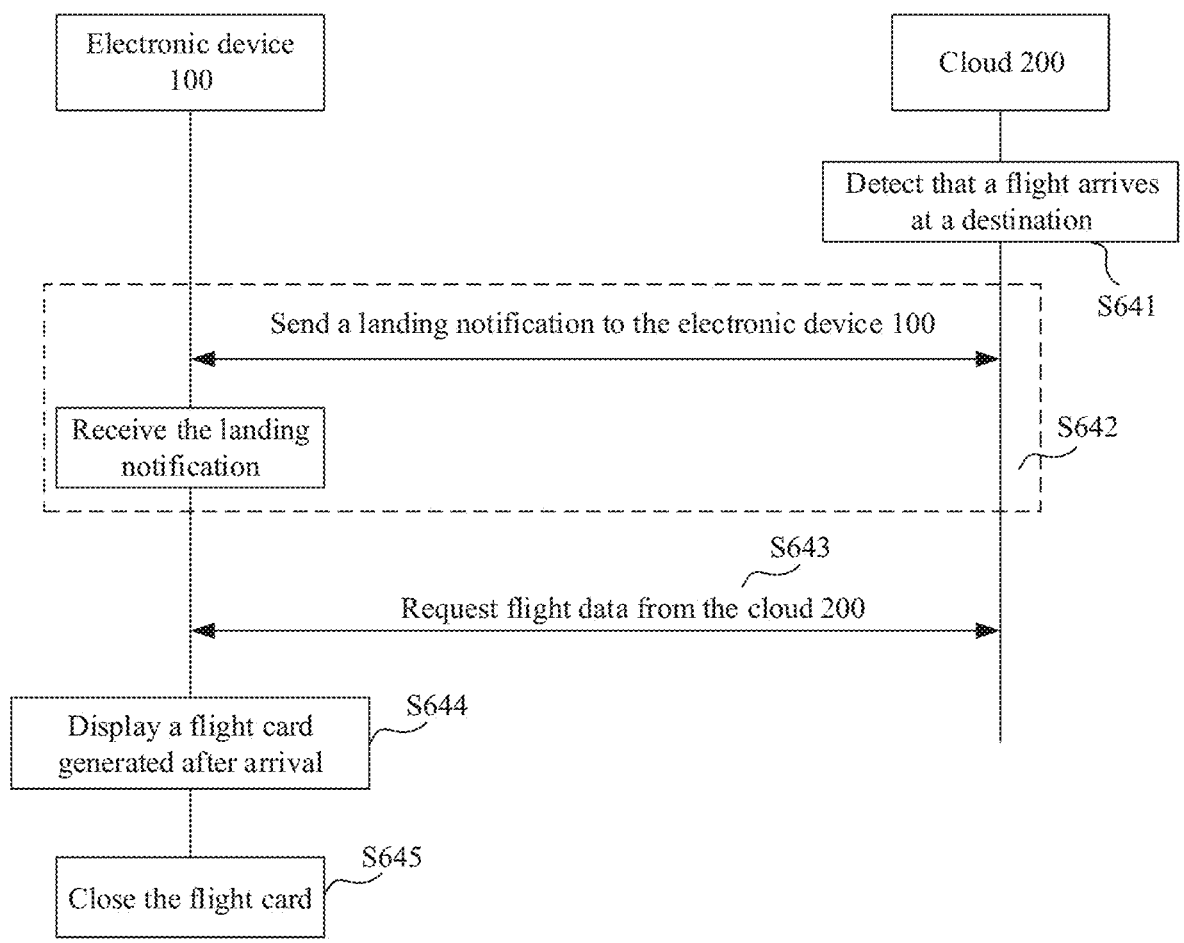

After the user arrives at the destination, the flight card may display information about user's luggage, and the card is closed after a period of time. FIG. 6E is a flowchart in which the electronic device 100 displays a flight card upon arrival at a destination.

S641: The cloud 200 detects that the flight arrives at the destination.

The cloud 200 may detect whether an airplane has landed at the destination airport, that is, whether the user has arrived at the destination. Specifically, when a current system time is the arrival time of the flight, the cloud 200 determines that the airplane that the user takes has landed at the destination airport, that is, the user has arrived at the destination.

S642: The electronic device 100 receives a landing notification.

After detecting that the flight has arrived at the destination, the cloud 200 may generate a push notification. The notification may be referred to as a landing notification. The notification may include a command indicating the electronic device 100 to request luggage information from the cloud 200. The luggage information is information about a placement location of passenger's luggage.

Then, the cloud 200 may invoke the push interface to send the push notification to the electronic device 100. The notification receiving module of the electronic device 100 may receive the landing notification. In response to the command, the electronic device 100 may obtain the luggage information from the cloud 200.

In some embodiments, the landing notification directly includes luggage information of the flight. In this way, when receiving the notification, the electronic device can obtain the luggage information without obtaining the luggage information from the cloud 200.

S643: The electronic device 100 obtains flight data from the cloud 200.

In response to the landing notification, the electronic device 100 may send a request to the cloud 200. Specifically, the cloud SDK may provide the read interface for the electronic device 100 to read data from the cloud 200. The card application may read the flight record of the user from the cloud 200) through the read interface. From the flight record, the electronic device 100 may obtain the flight data required for card display.

In response to a read operation of the electronic device 100, the cloud 200 may send the flight data of the user to the electronic device 100. Herein, the flight data includes luggage carousel information.

S644: The electronic device 100 displays a flight card generated after arrival.

After receiving the flight data sent by the cloud 200, the electronic device 100 may generate a new flight card and then display the card.

Specifically, after the cloud SDK obtains the flight data through the read interface, the cloud SDK may generate the new flight card based on the flight data. In this case, the flight card includes the luggage carousel information. Then, the decision module may indicate the display module to display the new flight card on the screen of the electronic device 100. Referring to FIG. 3H, after detecting that the flight has landed, the electronic device 100 may display the user interface 38 shown in FIG. 3H. In this case, the region B of the flight card 312 may display a luggage carousel.

In this way, the user can see the information about the user's luggage by starting the mobile phone after landing. Then, the user may go to a place indicated by the luggage carousel, to retrieve the luggage. This avoids an operation of querying luggage information by the user, reduces user operations, and improves user experience.

S645: The electronic device 100 closes the flight card.

After displaying the flight card generated after arrival, the electronic device 100 may close the flight card in a preset situation. Closing of the flight card by the electronic device 100 is considered as completion of the trip indicated by the flight card.

Specifically, the electronic device 100 may set a preset time period. After the preset time period ends, the electronic device 100 may determine that the user has completed the flight trip and left the destination airport. For example, the preset time period may be 30 minutes. The electronic device 100 may determine the 30 minute after the arrival time of the flight as a moment at which the user completes the trip, that is, a moment at which the user leaves the airport. When a current system time is later than the moment of leaving the airport, the electronic device 100 may determine that the user leaves the airport, and then the electronic device 100 may close the flight card.

In addition, the electronic device 100 may further obtain location data. The electronic device 100 may determine, based on time and location data, whether the user leaves the destination airport. If the current system time exceeds the arrival time by 30 minutes or more, and a current location indicates that the electronic device 100 is not within the geographical range of the destination airport, the electronic device 100 determines that the user has completed the trip and left the destination airport. Then, the electronic device 100 may close the flight card.

After determining that the user has completed the trip and left the destination airport, the electronic device 100 may close the flight card.

Not limited to the flight card, the dynamic card display method provided in embodiments of this application may further be applied to a schedule card. FIG. 7A to FIG. 7E show a group of user interfaces in which a mobile phone dynamically displays a schedule card.

Figure 7A:
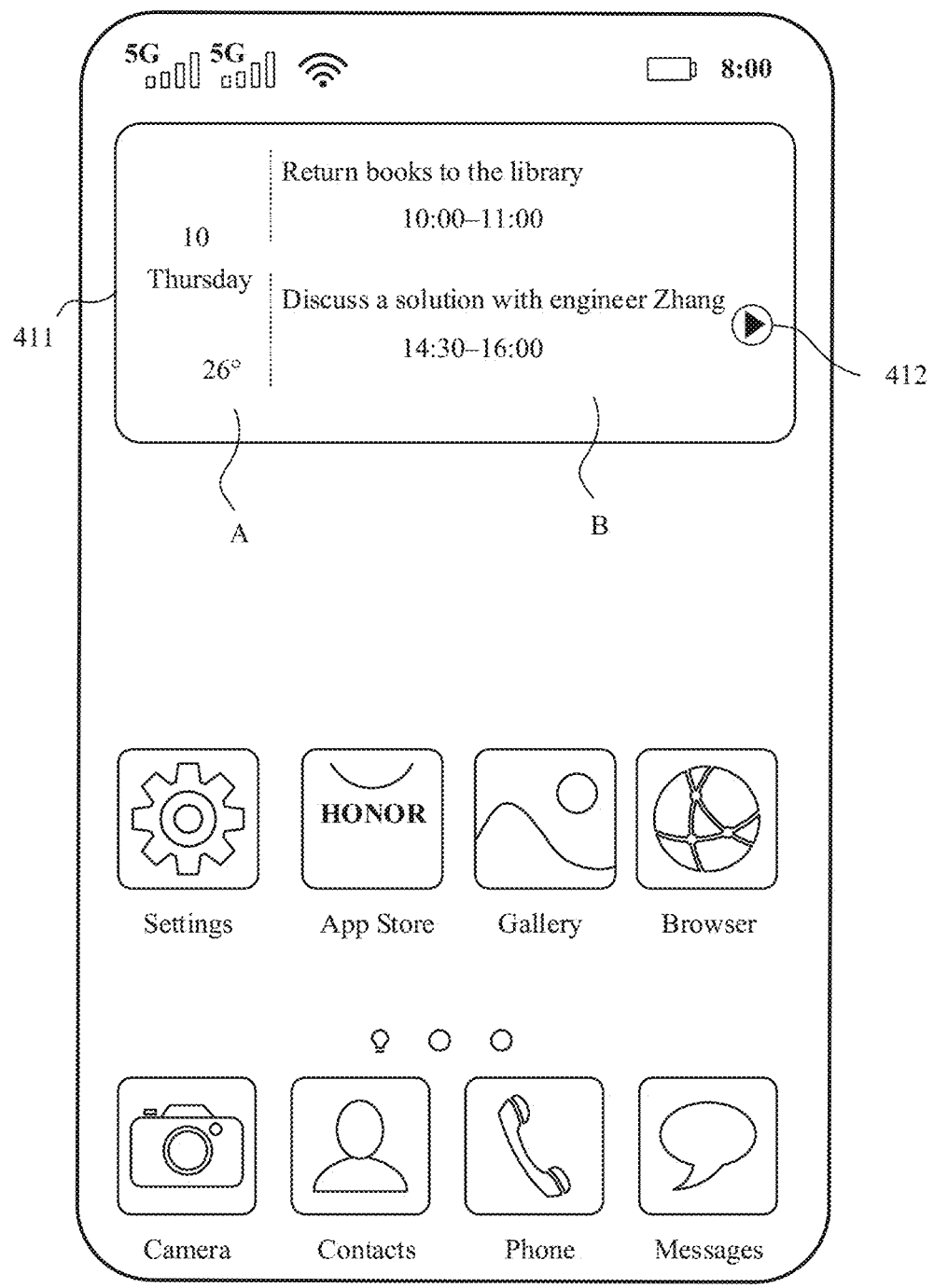
FIG. 7A to FIG. 7E show another group of user interfaces in which an electronic device displays a card according to an embodiment of this application.

FIG. 7A shows a user interface 71 for displaying a schedule card on the mobile phone. The user interface 71 may include a card 411. The card 411 may be used to display schedule information. The card 411 may also be divided into two regions: a left region and a right region (a region A and a region B).

The region A may display brief information about the day, such as a date ("10"), a day in a week ("Thursday"), and a temperature ("26° C."). The region B may display a schedule arranged by a user on the day, such as "Return books to the library, 10:00-11:00" and "Discuss a solution with engineer Zhang, 14:30-16:00".

The region B may further include a control 412. The control 412 may be used to display a network link attached to the schedule. The mobile phone may detect a user operation performed on the control 412. In response to the operation, the mobile phone may display content indicated by the link.

For example, when arranging the schedule "Discuss a solution with engineer Zhang, 14:30-16:00", the user may attach a conference link for a video conference to the schedule. When the mobile phone displays the schedule in the card 411, the link may be found. Then, the mobile phone may display the control 412 beside the schedule. When a user operation performed on the control 412 is detected, in response to the operation, the mobile phone may invoke an application for performing the video conference, and display a user interface for performing the video conference. In this way, the user can directly join the video conference via the control 412.

Because content that can be displayed in a card is very limited, usually, two schedules can be displayed in the schedule card, referring to FIG. 7A. When the user arranges more than two schedules on one day, the schedule card cannot display all the schedules. In this case, the mobile phone may selectively display all the schedules on the day with reference to a system time.

Specifically, the mobile phone may first sort all the schedules on the day in a time sequence. Then, the mobile phone may obtain a current system time, and determine two schedules that are after the system time and that are closest to the system time. The two schedules are schedules that are selected by the mobile phone and that are to be displayed in the card. Therefore, as the system time changes, the schedules displayed in the card change accordingly.

Figure 7B:
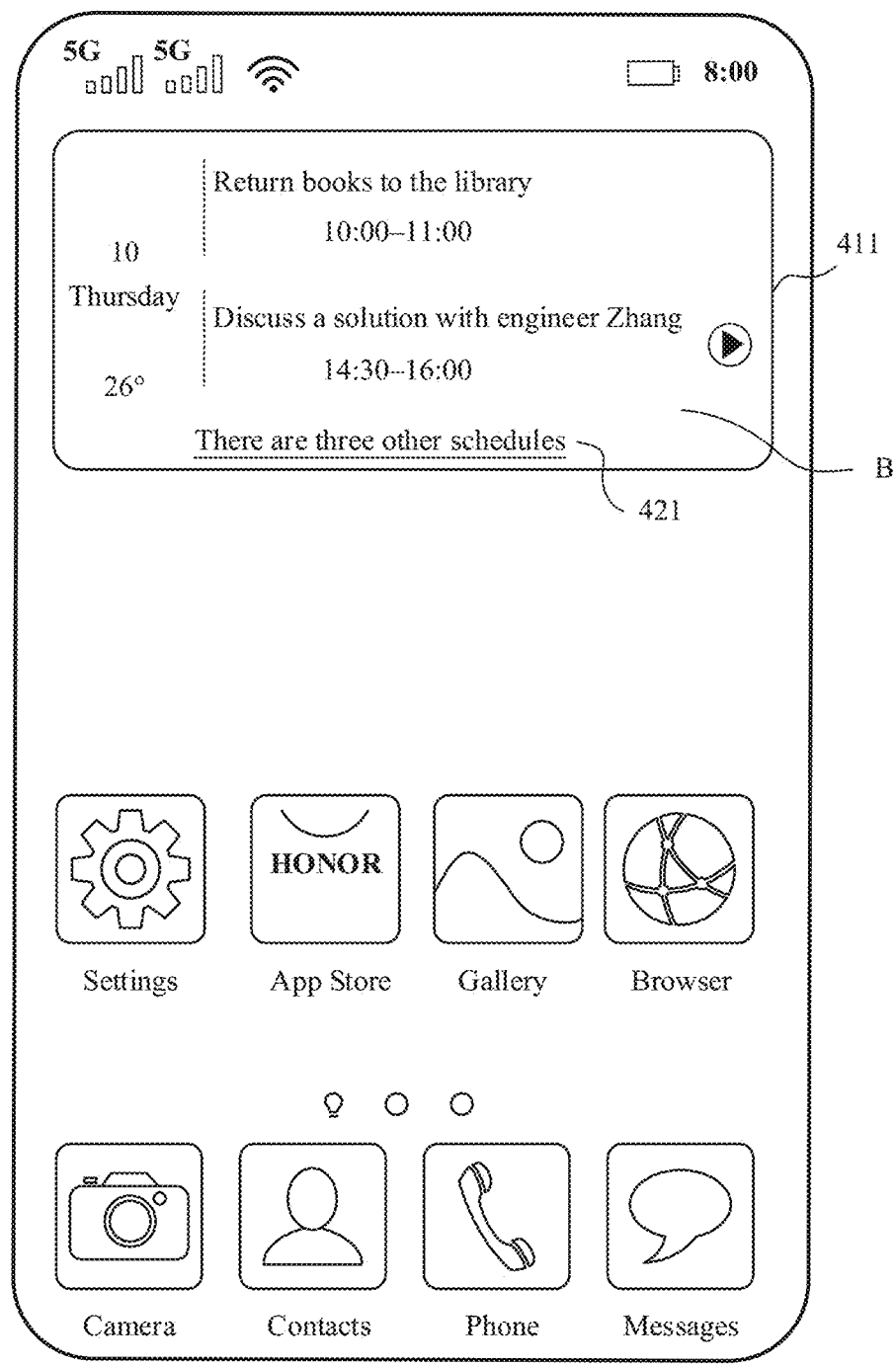
Figure 7C:
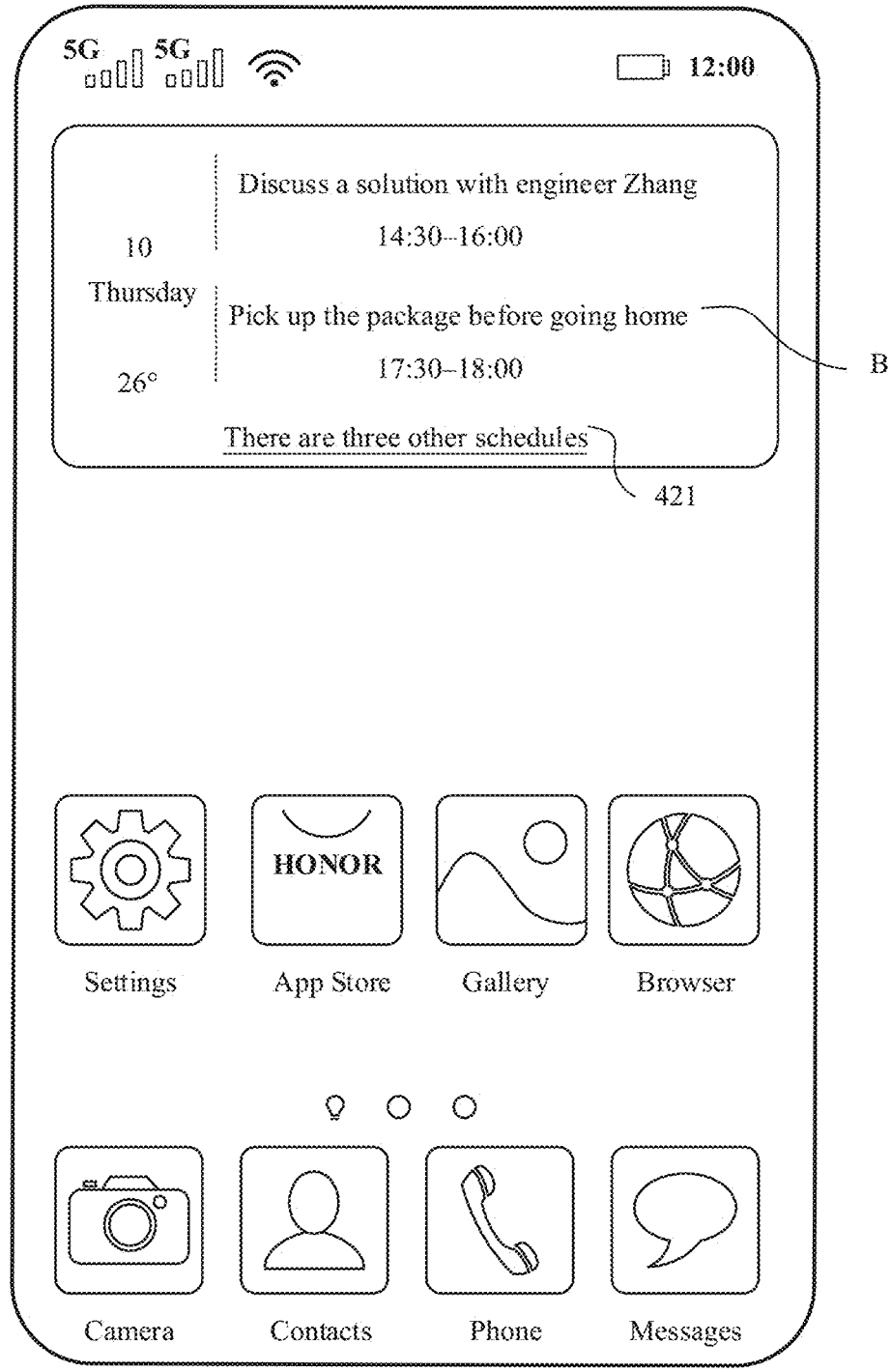

FIG. 7B and FIG. 7C each show an example of a user interface in which the mobile phone selectively displays schedules on the day according to the system time.

First, the mobile phone records five schedules on a day in a time sequence:
1. get up, 7:00;
2. return books to the library, 10:00-11:00;
3. discuss a solution with engineer Zhang, 14:30-16:00;
4. pick up the package before going home, 17:30-18:00; and
5. book an air ticket, 21:00.

As shown in FIG. 7B, in this case, the system time of the mobile phone is "8:00". The mobile phone checks all schedules on the day and finds that a schedule closest to "8:00" is "Return books to the library, 10:00-11:00", followed by "Discuss a solution with engineer Zhang, 14:30-16:00". In this case, the mobile phone may choose to display the two schedules in the region B of the card 411.

Further, the region B of the card 411 may further include a control 421. The control 421 may prompt the user that there are other schedules on the day, such as "There are three other schedules". The mobile phone may further detect a user operation performed on the control 421. In response to the operation, the mobile phone may display a user interface of a schedule application. In the user interface of the schedule application, the user can view all the schedules.

When the system time is "12:00", referring to FIG. 7C, the mobile phone may adjust, according to the new system time, the content displayed in the region B. Specifically, according to the new system time, the mobile phone may determine that a schedule closest to "12:00" is "Discuss a solution with engineer Zhang, 14:30-16:00", followed by "Pick up the package before going home, 17:30-18:00". Then, the mobile phone may choose to display the two schedules in the region B. Similarly, if the user wants to view other schedules, the user may view the schedules by using the control 421.

In addition, the mobile phone may further detect whether there is a conflict between the schedules on the day, that is, whether occurrence times of the schedules overlap. If a conflict is detected, the mobile phone may mark conflicting schedules and prompt the user.

Figure 7D:
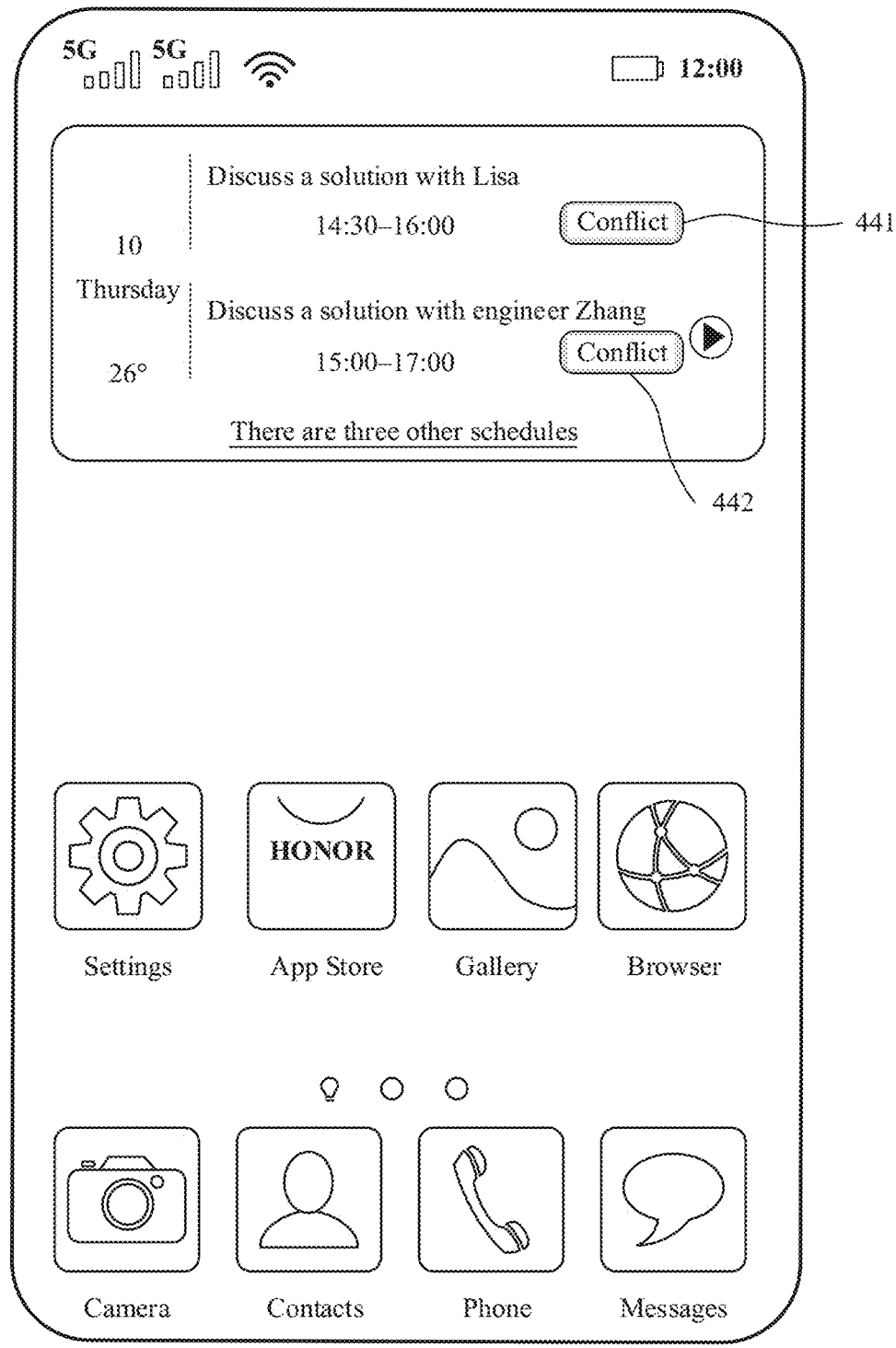

FIG. 7D shows an example user interface 74 in which the mobile phone displays conflict marks. As shown in FIG. 7D, the first schedule in the region B is "Discuss a solution with Lisa, 14:30-16:00". In this case, an occurrence time of the first schedule is "14:30-16:00". The second schedule in the region B is "Discuss a solution with engineer Zhang, 15:00-17:00". In this case, an occurrence time of the second schedule is "15:00-17:00". The foregoing two schedules both include 15:00-16:00. Therefore, the foregoing two schedules conflict.

When the foregoing conflict is detected, the mobile phone may display conflict marks, such as a mark 441 and a mark 442, beside the conflicting schedules. After seeing the marks, the user may immediately learn that there is a conflict between the foregoing two schedules. Then, the user may adjust the times of the two schedules to avoid a conflict.

Before the day ends, the region B of the schedule card may further display a schedule on a next day, including a quantity of schedules on the next day, a start time of the first schedule, and the like.

Figure 7E:
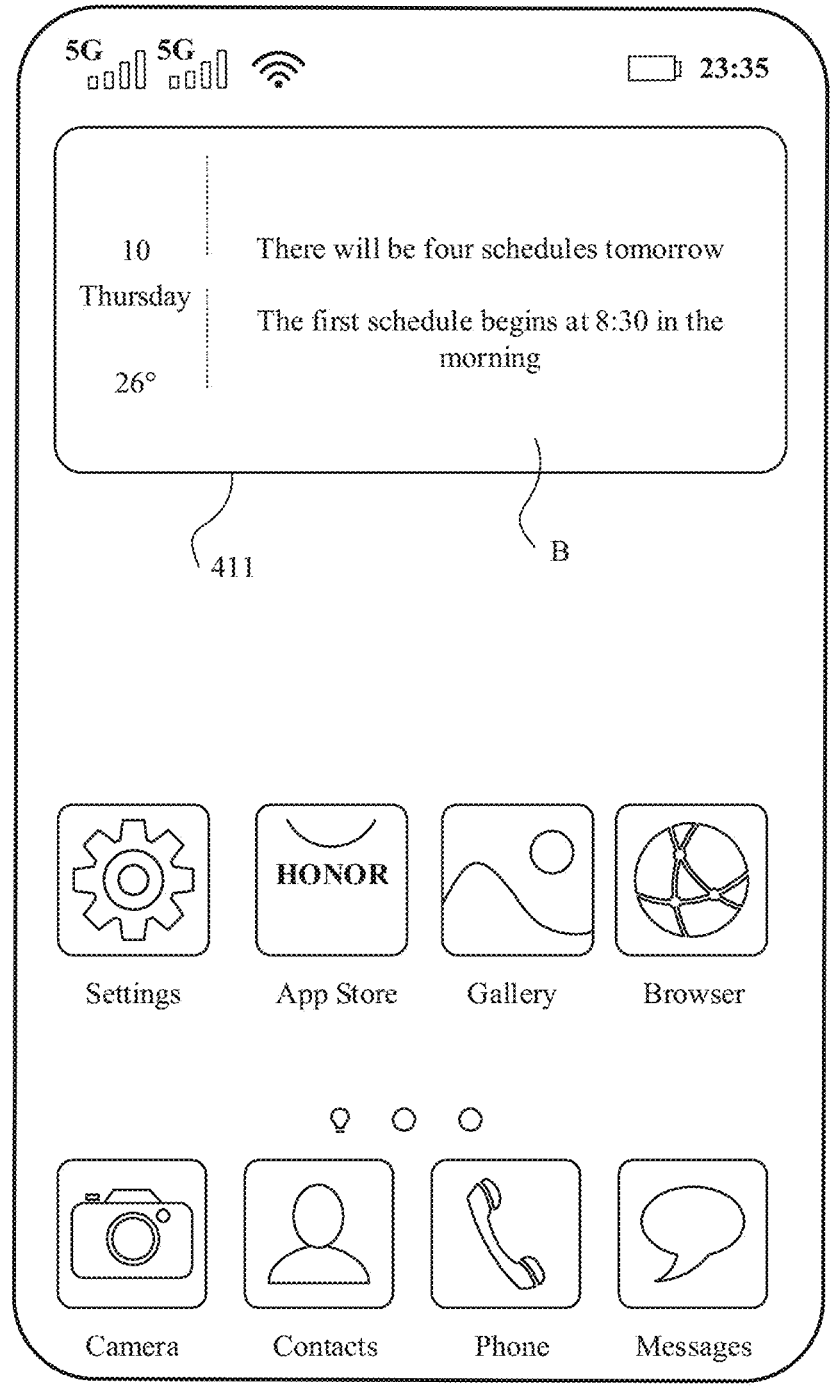

FIG. 7E shows a user interface 75 for displaying a schedule on a next day in a schedule card of a mobile phone. As shown in FIG. 7E, a current time shown in the user interface 75 is 23:35, that is, a time before the end of the day. In this case, the region B of the card 411 may display the schedule on the next day, for example. "There will be four schedules tomorrow, and the first schedule begins at 8:30".

A time for starting to display the schedule on the next day may be preset. For example, the time may be 23:30 on each day. Specifically, the mobile phone may obtain a current time. When the current time is later than 23:30, the mobile phone may determine that the schedule on the next day may start to be displayed. Then, the schedule card may display the schedule on the next day in the region B, as shown in FIG. 7E.

In another optional implementation, the time for starting to display the schedule on the next day may alternatively be determined based on a sleep time of the user. Specifically, the mobile phone may learn and determine a sleep time of the user on the current day based on sleep data of the user on previous days. If the sleep time is earlier than 23:30 on the current day, the mobile phone may set 30 minutes before the sleep time to the time for starting to display the schedule on the next day. If the sleep time is later than 23:30 on the current day, the mobile phone may set 23:00 to the time for starting to display the schedule on the next day. When the time reaches 24:00, the mobile phone may no longer display the schedule on the next day, that is, end displaying a card of the schedule on the next day.

The foregoing 23:30, 23:00, and 30 minutes are all preset times or time intervals. The foregoing preset time or time interval is adjustable. This is not limited in this embodiment of this application. In this way, the user can learn of a schedule on a next day in advance before a day ends.

Figure 8:
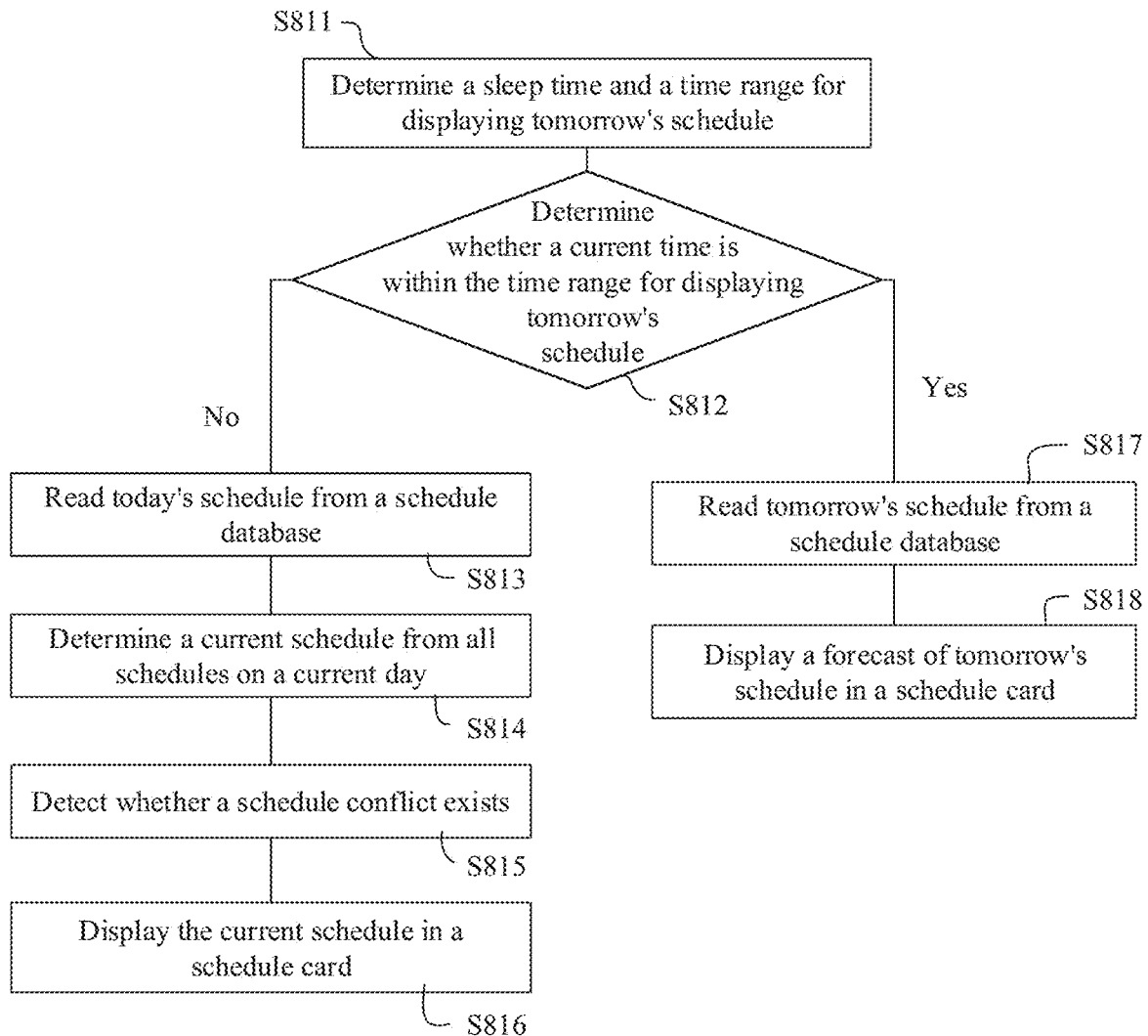
FIG. 8 is another flowchart in which an electronic device changes content of a card according to an embodiment of this application.

With reference to FIG. 8, the following specifically describes a processing procedure in which the electronic device 100 displays a schedule card.

S811: The electronic device 100 determines a sleep time and a time range for displaying tomorrow's schedule in the schedule card.

First, the electronic device 100 may determine the sleep time of a user.

The electronic device 100 may record a sleep time of the user on each day. The electronic device 100 has a learning capability. Therefore, the electronic device 100 may predict a sleep time of the user on a current day by learning a historical sleep time. In this way, when a new day starts, the electronic device 100 may determine a sleep time of the user on the current day based on a sleep time before the day. A method in which the electronic device 100 predicts the sleep time on the current day based on the historical sleep time is not limited in this embodiment of this application.

Herein, the sleep time of the user that is on the current day and that is determined by the electronic device 100 is predicted but not actual, and is used to determine whether to display a schedule on the current day or tomorrow's schedule in the schedule card. After the day ends, the electronic device 100 may modify the sleep time on the current day based on an actual sleep time of the user, that is, replace the previously predicted sleep time on the current day with the actual sleep time, to help subsequently predict a sleep time of the user.

For example, the electronic device 100 currently needs to predict today's (January 9) sleep time of the user. First, the electronic device 100 may obtain sleep times on 100 days before today (January 9) as historical sleep times. The foregoing 100 days are preset, and may alternatively be 200 days or the like. This is not limited in this embodiment of this application. Then, by learning the history sleep times, the electronic device 100 may determine today's sleep time of the user, such as 23:50 in the evening. Further, the electronic device 100 may determine, based on the predicted sleep time (23:50), whether to display today's schedule or tomorrow's schedule in the schedule card.

The actual sleep time of the user may be different from the predicted time. For example, the actual sleep time of the user may be 23:55. After today (January 9) ends, the electronic device 100 may determine that the sleep time of the user on January 9 is 23:55. In this way, when a sleep time on January 10 is predicted, the sleep time on January 9 used by the electronic device 100 is 23:55.

After determining the sleep time (predicted sleep time) on the current day, the electronic device 100 may determine the time range for displaying tomorrow's schedule in the schedule card. The electronic device 100 may determine, based on a difference between sleep times, different time ranges for displaying tomorrow's schedule.

Specifically, when the sleep time is earlier than 23:30, the electronic device 100 may determine that the time range for displaying tomorrow's schedule is 30 minutes before the sleep time. For example, if the sleep time of the user determined by the electronic device 100 is 23:10, the electronic device 100 may determine that the time range for displaying tomorrow's schedule is 22:40-23:10. It may be understood that the foregoing 30 minutes are preset, and the electronic device 100 may alternatively determine that the time range for displaying tomorrow's schedule is 40 minutes, 20 minutes, or the like. This is not limited in this embodiment of this application.

When the sleep time is later than 23:30, for example, is 23:40, the electronic device 100 may determine that the time range for displaying tomorrow's schedule is 23:30-24:00.

S812: The electronic device 100 determines whether a current time is within the time range for displaying tomorrow's schedule.

The electronic device 100 may periodically obtain a current system time. According to the current system time, the electronic device 100 may update a schedule displayed in the schedule card.

First, the electronic device 100 may determine whether the current system time is within the time range for displaying tomorrow's schedule. When determining that the current system time is not within the time range, the electronic device 100 may determine to display today's schedule in the schedule card.

For example, if a current sleep time of the user determined by the electronic device 100 is 23:10, the time range for displaying tomorrow's schedule by the electronic device 100 is 22:40-23:10. A current system time obtained by the electronic device 100 is 12:00. In this case, the current system time (12:00) is not within the time range (22:40-23:

10) for displaying tomorrow's schedule. Therefore, the electronic device 100 determines to display today's schedule in the schedule card.

If the electronic device 100 determines that the current system time is within the time range for displaying tomorrow's schedule, the electronic device 100 determines to display a forecast of tomorrow's schedule in the schedule card. Detailed descriptions are provided in the following S817 and S818, and is not provided herein.

S813: The electronic device 100 reads today's schedule from a schedule database.

A database (schedule database) for storing a schedule of the user is configured in the electronic device 100. The electronic device 100 may read schedule data of the user from the database. After determining to display today's schedule in the schedule card, the electronic device 100 may read all schedules on the current day from the database.

S814: The electronic device 100 determines, from all the schedules on the current day, a schedule to be displayed in the schedule card.

Referring to the descriptions in FIG. 7B and FIG. 7C, the electronic device 100 may obtain a plurality of schedules from the schedule database. After all today's schedules are obtained, the electronic device 100 may first sort the schedules to determine a time sequence of occurrence of the schedules. Certainly, if the schedules recorded in the schedule database have been sorted, the electronic device 100 does not need to sort all the schedules.

Then, the electronic device 100 may determine, from all the schedules on the current day according to the current system time, the schedule that needs to be displayed in the schedule card. Specifically, after obtaining the current system time, the electronic device 100 may determine that two schedules that are after the current system time and that are closest to the current system time are schedules that need to be displayed in the schedule card. As the current system time changes, the schedules displayed in the card change accordingly.

Referring to the schedule card shown in FIG. 7B and FIG. 7C, when the current system time is "8:00", the schedules displayed in the card 411 are "Return books to the library, 10:00-11:00" and "Discuss a solution with engineer Zhang, 14:30-16:00". The two schedules are schedules closest to the current system time "8:00". When the current system time is "12:00", the schedules displayed in the card 411 are "Discuss a solution with engineer Zhang, 14:30-16:00" and "Pick up the package before going home, 17:30-18:00". The two schedules are schedules closest to the current system time "12:00".

S815: The electronic device 100 detects whether a schedule conflict exists.

Then, the electronic device 100 may detect whether the schedules displayed in the schedule card conflict. Herein, the conflict means that occurrence times of two or more schedules overlap. Therefore, whether there is a conflict between schedules may be determined by occurrence times of the schedules. When determining that the conflict occurs, the electronic device 100 may mark the schedules as conflicting schedules. Further, when displaying the schedules, the electronic device 100 may display conflict marks in a region in which the schedules are displayed.

For example, in the schedule card shown in FIG. 7D, an occurrence time of the first schedule ("Discuss a solution with Lisa") is "14:30-16:00". An occurrence time of the second schedule ("Discussion a solution with engineer Zhang") is "15:00-17:00". The foregoing two schedules both include 15:00-16:00. Therefore, the foregoing two schedules conflict. In this case, the electronic device 100 may separately display conflict marks (a mark 441 and a mark 442) beside the schedule "Discuss a solution with Lisa" and the schedule "Discussion a solution with engineer Zhang".

In this way, when seeing the conflict mark, the user can determine, in a timely manner, that the schedule conflicts with another schedule, and then, the user can perform adjustment in a timely manner.

S816: The electronic device 100 displays today's schedule in the schedule card.

After conflict detection is completed, the electronic device 100 may display the schedule card on a screen of the electronic device 100. In this case, a schedule displayed in the schedule card is today's schedule.

S817: The electronic device 100 reads tomorrow's schedule from the schedule database.

After obtaining the current system time, the electronic device 100 first determines whether the current system time is within the time range for displaying tomorrow's schedule. If the electronic device 100 determines that the current system time is within the time range for displaying tomorrow's schedule, the electronic device 100 determines to display a forecast of tomorrow's schedule in the schedule card.

For example, if the current sleep time of the user determined by the electronic device 100 is 23:10, the time range for displaying tomorrow's schedule by the electronic device 100 is 22:40-23:10. The current system time obtained by the electronic device 100 is 22:50. In this case, the current system time (22:50) is within the time range (22:40-23:10) for displaying tomorrow's schedule. Therefore, the electronic device 100 may determine to display the forecast of tomorrow's schedule in the schedule card.

After determining to display tomorrow's schedule in the schedule card, the electronic device 100 may read all tomorrow's schedules from the schedule database.

S818: Determine, according to the current time, to display the forecast of tomorrow's schedule in the schedule card.

After obtaining all tomorrow's schedules, the electronic device 100 may obtain, from tomorrow's schedules, preset information that needs to be displayed. The preset information that needs to be displayed is the forecast of tomorrow's schedule. Then, the electronic device 100 may display the information in the schedule card.

Referring to the schedule card shown in FIG. 7E, the forecast of tomorrow's schedule may include a quantity of tomorrow's schedules and a start time of the first tomorrow's schedule. Therefore, after obtaining all tomorrow's schedules, the electronic device 100 needs to determine the quantity of tomorrow's schedules and the start time of the first tomorrow's schedule. Then, the electronic device 100 may display the foregoing information in the schedule card.

In the dynamic card display method shown in FIG. 8, the electronic device 100 may update, in real time, the schedule displayed in the schedule card. In this way, the user can more conveniently learn of a schedule of the user on the current day by using the schedule card. In addition, at the end of a day, the user can further learn of tomorrow's schedule in advance based on the forecast of tomorrow's schedule displayed in the card.

The dynamic card display methods shown in FIG. 2A to FIG. 2D, FIG. 3A to FIG. 3G, and FIG. 7A to FIG. 7E are not limited to being applied to the flight card or the schedule card, but may be applied to other cards. This is not limited in this embodiment of this application.

For example, the user may set a take-out card on a user interface such as a home page or a leftmost screen of the mobile phone. The take-out card may display an ongoing task in a take-out application (Meituan or Ele.me). When the user places a take-out order, with reference to the method shown in FIG. 3A to FIG. 3G, the take-out card may separately display basic information and extended information of the order on left and right sides of the card. The basic information includes a name of a merchant and a completion time of the order. The extended information includes order content and logistics information (such as information indicating that the courier has taken the food, a distance between the courier and the user, and an expected delivery time). When the user places another take-out order, with reference to the method shown in FIG. 2A to FIG. 2D, the card may separately display information about the two orders. Details are not described herein.

Figure 9:
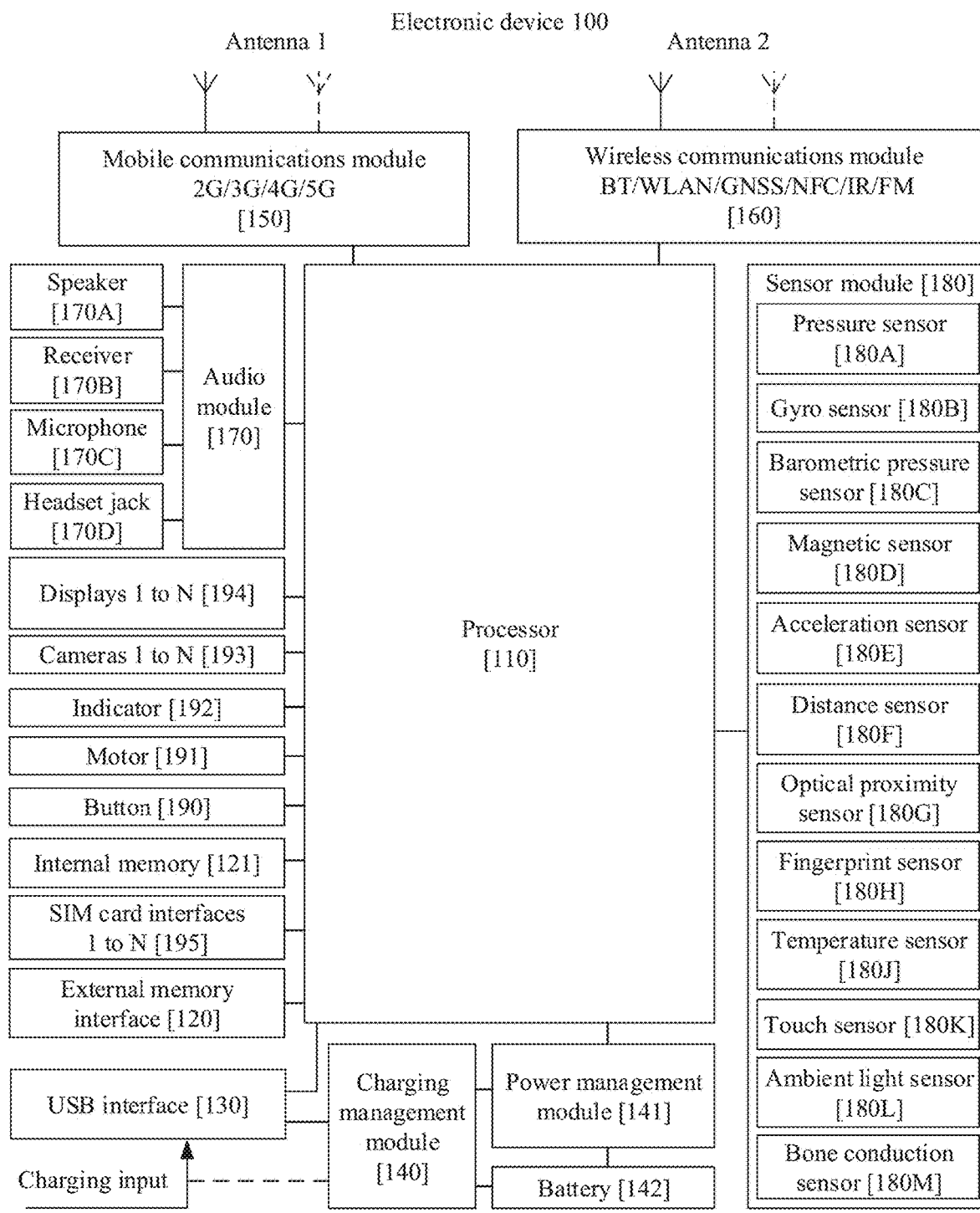
FIG. 9 is a diagram of a hardware structure of an electronic device according to an embodiment of this application.

The following describes a hardware structure of the electronic device 100 with reference to FIG. 9 according to an embodiment of this application.

In this embodiment of this application, the electronic device 100 is a mobile phone. Alternatively, the electronic device 100 may be a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, A1) device, a wearable device, a vehicle-mounted device, a smart home device, and/or a smart city device. A specific type of the electronic device 100 is not specifically limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface, MIPI), a general-purpose input/output (general-purpose input/output. GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may be configured to perform audio communication, and sample, quantize, and code analog signals. In some embodiments, the audio module 170 may be coupled to the wireless communications module 160 by using a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 and the camera 193 communicate with each other by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface conforming to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. The interface may alternatively be configured to connect to another electronic device, such as an AR device.

It may be understood that the interface connection relationship between the modules shown in this embodiment of the present invention is merely an example, and does not constitute a limitation on the structure of the electronic device 100. In other embodiments of this application, the electronic device 100 may alternatively use an interface connection manner that is different from the manner in the foregoing embodiment, or a combination of a plurality of interface connection manners.

The charging management module 140 is configured to receive charging input from a charger. The charger may be a wireless charger, or may be a wired charger. In some wired charging embodiments, the charging management module 140 may receive charging input of a wired charger through the USB interface 130. In some wireless charging embodiments, the charging management module 140 may receive wireless charging input through a wireless charging coil of the electronic device 100. When charging the battery 142, the charging management module 140 may further supply power to the electronic device through the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may also be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a solution for wireless communication, including 2G/3G/4G/5G and the like, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110 and disposed in a same device as the mobile communications module 150 or another function modules.

The wireless communications module 160 may provide a solution for wireless communication that is applied to the electronic device 100 and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components that integrate at least one communications processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device according to a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation systems, SBAS).

In embodiments of this application, the mobile communications module 150 supports the electronic device 100 in accessing the cloud 200 by using a cellular network and obtaining flight data from the cloud 200. The mobile communications module 150 also supports the electronic device 100 in obtaining location data of the device by using cellular data.

In embodiments of this application, the wireless communications module 160 supports the electronic device 100 in accessing the cloud 200 in a wireless communication manner such as a wireless local area network (WLAN, Wi-Fi) and obtaining flight data from the cloud 200. The wireless communications module 160 supports the electronic device 100 in obtaining location data (a current location) by using a CPS.

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

In embodiments of this application, the user interfaces shown in FIG. 2A to FIG. 20, FIG. 3A to FIG. 3G, and FIG. 7A to FIG. 7E may be displayed through the GPU and the display 194.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using a lens and projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to processing the digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement applications such as intelligent cognition of the electronic device 100, for example, image recognition, facial recognition, voice recognition, and text understanding.

The internal memory 121 may include one or more random access memories (random access memory. RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a 5th generation DDR SDRAM is usually referred to as DDR5 SDRAM), and the like.

The non-volatile memory may include a disk storage device and a flash memory (flash memory).

According to operation principles, the flash memory may include NOR FLASH, NAND FLASH, 3D NAND FLASH, and the like. According to quantities of potential levels of storage units, the flash memory may include a single-level cell (single-level cell, SLC), a multi-level cell (multi-level cell, MLC), a triple-level cell (triple-level cell, TLC), a quad-level cell (quad-level cell, QLC), and the like. According to storage specifications, the flash memory may include a universal flash storage (English: universal flash storage, UFS), an embedded multimedia card (embedded multimedia Card, eMMC), and the like.

The random access memory may be directly read and written by the processor 110, may be configured to store an executable program (for example, a machine instruction) of an operating system or another running program, and may be further configured to store data of a user and an application.

The non-volatile memory may also store an executable program, data of a user and an application, and the like, and may be loaded into the random access memory in advance, for direct reading and writing by the processor 110.

The external memory interface 120 may be configured to connect to an external non-volatile memory, to extend a storage capability of the electronic device 100. The external non-volatile memory communicates with the processor 110 by using the external memory interface 120, to implement a data storage function. For example, files such as music or videos are stored in the external non-volatile memory.

The electronic device 100 may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed on the electronic device 100. In some other embodiments, two microphones 170C may be disposed on the electronic device 100. In addition to sound signal collection, a noise reduction function may be further implemented. In some other embodiments, three, four, or more microphones 170C may be alternatively disposed on the electronic device 100, to collect a sound signal, implement noise reduction, recognize a sound source, implement a directional recording function, and the like.

The headset jack 170D is configured to connect to a wired headset. The headset jack 170D may be the USB interface 130, or may be a 3.5 mm open mobile terminal platform (open mobile terminal platform. OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines strength of the pressure based on the change of the capacitance. When a touch operation is performed on the display 194, the electronic device 100 detects strength of the touch operation through the pressure sensor 180A. The electronic device 100 may also calculate a position of the touch based on a detection signal of the pressure sensor 180A. In some embodiments, touch operations performed on a same touch position but has different touch operation strength may correspond to different operation instructions. For example, when a touch operation whose touch operation strength is less than a first pressure threshold is applied to a Messages icon, an instruction for viewing an SMS message is executed. When a touch operation whose touch operation strength is greater than or equal to the first pressure threshold is applied to the Messages icon, an instruction for creating an SMS message is executed.

The gyro sensor 180B may be configured to determine a motion gesture of the electronic device 100. In some embodiments, angular velocities of the electronic device 100 around the three axes (that is, the x-axis, the y-axis, and the z-axis) may be determined by using the gyro sensor 180B. The gyro sensor 180B may be used for image stabilization during photographing. For example, when a shutter is pressed, the gyro sensor 180B detects a jittering angle of the electronic device 100, calculates, based on the angle, a distance for which a lens module needs to compensate, and enables the lens to offset jittering of the electronic device 100 through reverse motion, so as to implement image stabilization. The gyro sensor 180B may be further used in a navigation scenario and a motion-controlled gaming scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect values of acceleration of the electronic device 100 in all directions (usually on three axes). When the electronic device 100 is static, the acceleration sensor 180E may detect magnitude and a direction of gravity. The acceleration sensor 180E may be further configured to recognize a posture of the electronic device, and is applied to an application such as switching between landscape mode and vertical mode and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light-emitting diode (LED) and a light detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to the ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, or the like based on a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142 to avoid abnormal shutdown of the electronic device 100 that is caused due to the low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch device". The touch sensor 180K may be disposed on the display 194. The touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

In embodiments of this application, the touch sensor 180K may support an operation such as tapping or sliding performed by a user on the screen. In response to the operation, the electronic device 100 may display a user interface corresponding to the operation. For example, in the user interface shown in FIG. 2C, the touch sensor 180K may detect a user operation performed by the user on the region B1, and in response to the operation, the electronic device 100 may display the user interface shown in FIG. 2D.

The bone conduction sensor 180M may obtain a vibration signal. In some embodiments, the bone conduction sensor 180M may obtain a vibration signal of a vibration bone of a human vocal cord part. The bone conduction sensor 180M may also be in contact with a human pulse, and receive a blood pressure beating signal. In some embodiments, the bone conduction sensor 180M may also be disposed in the headset, to form a bone conduction headset. The audio module 170 may obtain a voice signal through parsing based on the vibration signal, of the vibration bone of the vocal cord part, that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be used for an incoming call vibration prompt, or may be used for touch vibration feedback. For example, touch operations performed on different applications (for example, photo taking and audio playing) may be corresponding to different vibration feedback effects. The motor 191 may also correspond to different vibration feedback effects for touch operations performed in different regions of the display 194. Different application scenarios (for example, a time prompt, information receiving, an alarm clock, and a game) may also be corresponding to different vibration feedback effects. A touch vibration feedback effect may be further customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195, to implement contact with or separation from the electronic device 100. The electronic device 100 may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using a SIM card, to implement functions such as conversation and data communication. In some embodiments, the electronic device 100 uses an eSIM, namely, an embedded SIM card. The eSIM card may be embedded in the electronic device 100, and cannot be separated from the electronic device 100.

In the method provided in embodiments of this application, an electronic device such as a mobile phone may divide a card into two partitions: a left partition and a right partition. Then, the two partitions may display tasks in a same application relatively independently.

When there are a plurality of ongoing tasks in the application, the two partitions may separately display different tasks, and sizes of the left and right partitions are adjusted according to a preset rule, to display more information. When there is only one ongoing task in the application, the two partitions may display different information about the task. When one task is displayed, the electronic device such as the mobile phone may split to-be-displayed information of the task into different parts. Then, the information is selectively displayed according to a situation in which the user is currently located.

In this way, the electronic device such as the mobile phone can display more information by using one card, and information stacking can be avoided. Correspondingly, the user can obtain a large amount of comprehensive information, and the user can quickly and accurately obtain most desired information in a current situation. This avoids complexity and inconvenience caused by information stacking.

The term "user interface (user interface, UI)" in the specification, claims, and accompanying drawings of this application is a medium interface for interaction and information exchange between an application or an operating system and a user, and implement conversion between an internal form of information and an acceptable form of the user. A user interface of an application is source code compiled in a specific computer language such as Java or the extensible markup language (extensible markup language, XML). The interface source code is parsed and rendered on a terminal device, and finally presented as content that can be recognized by the user, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and a text. An attribute and content of the control in the interface are defined by using labels or nodes. For example, XML specifies, by using nodes such as <Textview>, <ImgView>, and <VideoView>, the control included in the interface. One node corresponds to one control or attribute in the interface. After being parsed and rendered, the node is presented as content that is visible to the user. In addition, interfaces of many applications such as a hybrid application (hybrid application) usually include a web page. The web page, also referred to as a page, may be understood as a special control embedded in an application interface. The web page is source code compiled in a specific computer language, such as the hyper text markup language (hyper text markup language, GTML), cascading style sheets (cascading style sheets, CSS), or JavaScript (JavaScript, JS). The web page source code may be loaded and displayed, by a browser or a web page display component with a function similar to that of the browser, as content that can be recognized by a user. Specific content included in the web page is also defined by using a label or a node in the web page source code. For example, GTML defines elements and attributes of the web page by using <p>, <img>, <video>, and <canvas>.

A common presentation form of the user interface is a graphic user interface (graphic user interface, GUI), which refers to a user interface that is displayed in a graphical manner and that is related to a computer operation. The GUI may be an interface element such as an icon, a window, or a control displayed on a display of an electronic device. The control may include a visible interface element such as an icon, a button, a menu, a tab, a text box, a dialog box, a status bar, a navigation bar, or a widget.

As used in the specification and the appended claims of this application, the singular expressions "a", "one", "the", "the foregoing", "this", and "the one" are intended to also include plural expressions, unless otherwise expressly indicated in the context. It should be further understood that the term "and/or" used in this application refers to and includes any or all possible combinations of one or more listed items. As used in the foregoing embodiments, according to the context, the term "when" may be interpreted as "if", "after", "in response to determining", or "in response to detecting". Similarly, according to the context, the phrase "when determining" or "if detecting (the stated condition or event)" may be interpreted as "if determining". "in response to determining". "when detecting (the stated condition or event)", or "in response to detecting (the stated condition or event)".

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures in the methods in the foregoing embodiments may be completed by a computer program instructing related hardware. The program may be stored in a computer-readable storage medium. When the program is executed, the procedures in the foregoing method embodiments may be included. The foregoing storage medium includes any medium that can store program code, such as a ROM or a random access memory RAM, a magnetic disk, or an optical disc.

What is claimed is:

1. A dynamic card display method, wherein the method comprises:
    obtaining a first task and a second task from a first application, wherein the first task has a higher priority than the second task;
    displaying a first interface, wherein the first interface displays a first card, the first card comprises a first region and a second region, the first region displays basic information of the first task, and the second region displays basic information of the second task;
    obtaining first status data, wherein the first status data is data obtained based on a preset status data type; and
    adjusting content displayed in at least one of the first region or the second region, wherein the adjusting, based on the first status data, the content comprises:
        determining, based on one or more of time data or location data, that a status of the first task or the second task has changed; and
        in response to determining that the status of the first task or the second task has changed based on the one or more of time data or location data, automatically replacing, without user interaction, the basic information of the second task displayed in the second region with extended information of the first task.

2. The method according to claim 1, wherein the preset status data type comprises one or more of user operation data, time data, location data, an SMS message, and cellular data, and the user operation data is data generated by a user operation.

3. The method according to claim 1, further comprising: when user operation data is not obtained within a preset time period, increasing a display area of the first region and reducing a display area of the second region.

4. The method according to claim 1, wherein the first card is a card for displaying a flight trip; the first task represents a first flight, the second task represents a second flight; the basic information comprises more than one of a flight number, a trip date, a departure place, a departure time, a destination, or an arrival time; and the extended information comprises a check-in time or a check-in counter.

5. The method according to claim 4, wherein the determining, based on one or more of time data or location data, that a status of the first task or the second task has changed comprises: determining, based on a current time, that a check-in time has approached, and the automatically replacing, without user interaction, the basic information of the second task displayed in the second region with extended information of the first task comprises: automatically replacing, without user interaction, the basic information of the second flight displayed in the second region with check-in information of the first flight.

6. The method according to claim 1, wherein the first card is a card for displaying a schedule, the basic information comprises a schedule occurrence date, and the extended information comprises a planned schedule on the date.

7. An electronic device, comprising one or more processors and one or more memories, wherein the one or more memories are coupled to the one or more processors, the one or more memories store programming instructions for execution by the one or more processors to cause the electronic device to perform operations comprising:
    obtaining a first task and a second task from a first application, wherein the first task has a higher priority than the second task;
    displaying a first interface, wherein the first interface displays a first card, the first card comprises a first region and a second region, the first region displays basic information of the first task, and the second region displays basic information of the second task;
    obtaining first status data, wherein the first status data is data obtained based on a preset status data type; and
    adjusting content displayed in at least one of the first region or the second region, wherein the adjusting, based on the first status data, the content comprises:
        determining, based on one or more of time data or location data, that a status of the first task or the second task has changed; and
    in response to determining that the status of the first task or the second task has changed based on the one or more of time data or location data, automatically replacing, without user interaction, the basic information of the second task displayed in the second region with extended information of the first task.

8. A non-transitory computer-readable storage medium, comprising instructions that, when executed by one or more processors, cause a computing device to perform operations comprising:
    obtaining a first task and a second task from a first application, wherein the first task has a higher priority than the second task;
    displaying a first interface, wherein the first interface displays a first card, the first card comprises a first region and a second region, the first region displays basic information of the first task, and the second region displays basic information of the second task;
    obtaining first status data, wherein the first status data is data obtained based on a preset status data type; and
    adjusting content displayed in at least one of the first region or the second region, wherein the adjusting, based on the first status data, the content comprises:
        determining, based on one or more of time data or location data, that a status of the first task or the second task has changed; and
    in response to determining that the status of the first task or the second task has changed based on the one or more of time data or location data, automatically replacing, without user interaction, the basic information of the second task displayed in the second region with extended information of the first task.

* * * * *